(12) United States Patent
Pronovost

(10) Patent No.: US 12,337,878 B2
(45) Date of Patent: Jun. 24, 2025

(54) PREDICTION MODEL WITH VARIABLE TIME STEPS

(71) Applicant: Zoox, Inc., Foster City, CA (US)

(72) Inventor: Ethan Miller Pronovost, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 288 days.

(21) Appl. No.: 18/072,423

(22) Filed: Nov. 30, 2022

(65) Prior Publication Data

US 2024/0174266 A1    May 30, 2024

(51) Int. Cl.
*B60W 60/00*  (2020.01)
*G06N 3/044*  (2023.01)

(52) U.S. Cl.
CPC ....... *B60W 60/00274* (2020.02); *G06N 3/044* (2023.01)

(58) Field of Classification Search
CPC .... B60W 60/00274; G06N 3/044; G06N 5/01
See application file for complete search history.

(56) References Cited

U.S. PATENT DOCUMENTS

| | | | |
|---|---|---|---|
| 9,463,795 | B2 | 10/2016 | Minemura et al. |
| 11,521,396 | B1 | 12/2022 | Jain et al. |
| 2006/0095193 | A1 | 5/2006 | Nishira et al. |
| 2019/0102679 | A1 | 4/2019 | Roberts |
| 2020/0182618 | A1* | 6/2020 | Xu ................ G06F 18/214 |
| 2020/0326719 | A1 | 10/2020 | Tram et al. |
| 2021/0026359 | A1 | 1/2021 | Macgregor |
| 2021/0039639 | A1 | 2/2021 | Song et al. |
| 2023/0022820 | A1 | 1/2023 | Ogino |
| 2023/0096493 | A1 | 3/2023 | Alamdari Sajadi et al. |
| 2024/0116506 | A1 | 4/2024 | Tominaga et al. |
| 2024/0174265 | A1 | 5/2024 | Pronovost |

FOREIGN PATENT DOCUMENTS

| | | | |
|---|---|---|---|
| WO | WO-2020198189 A1 * | 10/2020 | ............ B60W 30/09 |
| WO | WO-2022226434 A1 * | 10/2022 | |

OTHER PUBLICATIONS

PCT Search Report and Written Opinion mailed Mar. 28, 2024 for PCT Application No. PCT/US2023/081958 from PCT Summary, 11 pages.
Office Action for U.S. Appl. No. 18/072,469, Dated Sep. 24, 2024, Pronovost, "Determining Prediction Times for a Model", 24 pages.

\* cited by examiner

*Primary Examiner* — Anne Marie Antonucci
*Assistant Examiner* — Jingli Wang
(74) *Attorney, Agent, or Firm* — Lee & Hayes, P.C.

(57) ABSTRACT

Techniques for implementing a machine learned model to determine variable step sizes for searching a decision tree are described herein. For example, the techniques may include a computing device implementing a tree search algorithm to search the decision tree comprising nodes representing different possible object actions and/or vehicle actions at a future time. A search of the decision tree can be performed using multiple steps associated with different time periods to output a vehicle trajectory for the vehicle. The vehicle trajectory can be sent to a vehicle computing device for consideration during vehicle planning, which may include simulation.

20 Claims, 8 Drawing Sheets

PREDICTION MODEL WITH VARIABLE TIME STEPS

BACKGROUND

Machine learned models can be employed to predict an action for a variety of robotic devices. For instance, planning systems in autonomous and semi-autonomous vehicles determine actions for a vehicle to take in an operating environment. Actions for a vehicle may be determined based in part on avoiding objects present in the environment. For example, an action may be generated to yield to a pedestrian, to change a lane to avoid another vehicle in the road, or the like. The actions can be based on an output from a decision tree.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
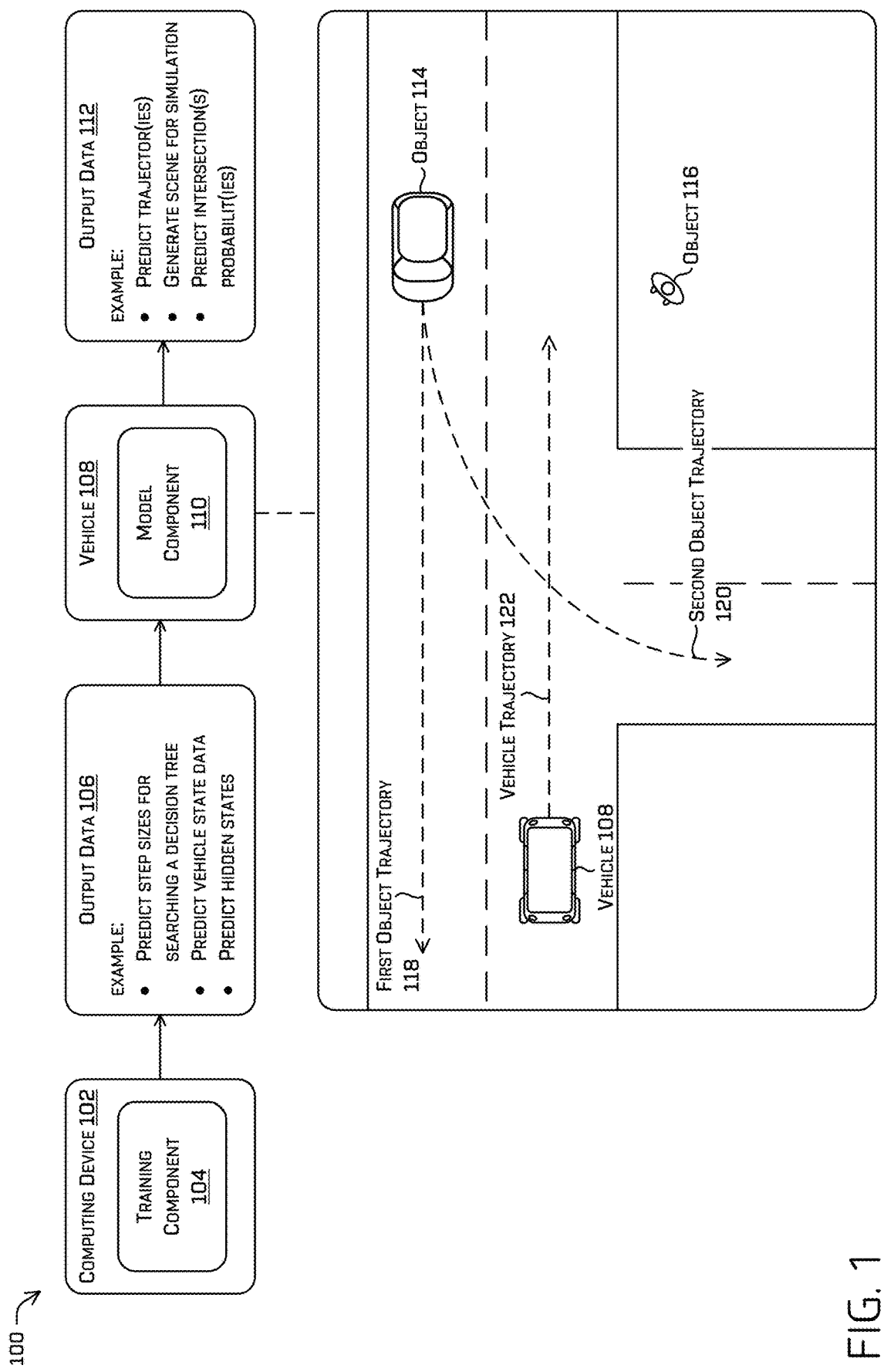
FIG. 1 is an illustration of an example environment, in which an example vehicle applies a trained model to predict occupancy of one or more example objects at a future time.

This application describes techniques for a machine learned model to use variable step sizes to search a decision tree encoded with vehicle, object, and environment information. A computing device can implement a tree search algorithm to search the decision tree comprising nodes representing different possible object actions and/or vehicle actions at a future time. A search of the decision tree can include multiple steps over a time period (e.g., 8 seconds), and each step of the search can be associated with a different time period. For example, the tree search algorithm can generate an output (e.g., a vehicle trajectory, vehicle position, object trajectory, etc.) after searching a particular number of branches and/or nodes for a first time period of a first step and a second time period of a second step, and so on for the overall time period of the search. A step size can refer to an amount of time associated with a particular step. The step sizes output by the machine learned model can be used by a computing device of a vehicle to improve how the vehicle plans for a potential interaction with an object. By determining variable step sizes for a decision tree as described herein, the machine learned model can dedicate more processing resources to an earlier step(s) of decision tree search and less processing resources for a subsequent, longer step thereby reducing computational resources to determine an output by the decision tree.

In various examples, a search of a decision tree can include multiple steps having variable time periods that collectively equal an amount of time in the future. For instance, a first step of the search can be for 1 second (or other time), a second step of the search of the decision tree can be for 2 seconds, and a third step can be for 3 seconds to predict potential interactions between the vehicle and the object(s) 6 seconds in the future (or another time depending on the number of steps and time period associated with each step). By training a machine learned model as described herein, a robotic device implementing the decision tree can conduct a more in depth tree search using the same available computational resources (e.g., more time to explore a branch) compared to a machine learned model trained to use fixed step sizes (e.g., fixed time periods for each step of a tree search). In some examples, determining variable step sizes can include outputting at least one time period for a step that is different than another time period of another step to enable a more accurate and/or in depth search.

A machine learned model trained using the techniques described herein improves efficiency of using available computational resources (e.g., memory, processor(s), etc.) to search a decision tree while also improving output accuracy versus techniques that use a fixed time period for each of the steps of a decision tree search. In some examples, more computational resources can be spent using a first step size (e.g., 1 second) to achieve a higher resolution output relative to a second step size (e.g., 2 second) that occurs at a later time and although longer has a lower resolution output. Using the techniques described herein enables a real-time processing engine and to consider a variety of potential vehicle and object actions in the environment relative to a model using a fixed time steps.

In some examples, different models associated with different step sizes can be implemented by an autonomous vehicle navigating in an environment to vary how the decision tree is searched based on characteristics of the autonomous vehicle, the environment, and/or an object in the environment. For instance, a first model may be used by the autonomous vehicle to search a decision tree using a first step size followed by a relatively longer step size based on the autonomous vehicle being in a faster moving environments (e.g., a velocity of the autonomous vehicle or a velocity of an object proximate thereof is above a threshold velocity). In some examples, the autonomous vehicle can detect a number of objects and implement a second model to search the decision tree using step sizes that better capture potential actions of the objects (e.g., a different model may be used for a dense urban environment).

Training a machine learned model can include a computing device implementing a training component to receive a variety of training data including state data associated with a vehicle and/or an object, log data associated with an autonomous vehicle, map data, step size data indicating a time period for one or more step sizes, or other data. In some examples, the training data can be received from a machine learned model configured to determine vehicle state data (e.g., a position, an orientation, a velocity, a yaw, an acceleration, etc.) based on a search using fixed step sizes (e.g., four one second step sizes to determine the vehicle state four seconds from a current time). Thus, fixed step sizes can be used in some examples to train a machine learned model that outputs variable step sizes.

In various examples, the training component can randomize a length of the time period associated with a step received as training data. The training component can compare outputs of the decision tree to "ground truth" data to determine whether or not to adjust the time period for the step. In some examples, a time period for at least one step can be determined with consideration to a previous time period determination for another step of a search comprising multiple steps. Additional detail for training a machine learned model is included throughout this disclosure including in FIGS. 3 and 4.

Generally, searching a decision tree can include a computing device determining which nodes, branches, etc. of the decision tree to explore based on applying a tree search algorithm. In some examples, the computing device can receive data (e.g., sensor data, map data, object state data, vehicle state data, control policy data, etc.) and determine step sizes that optimize predictions associated with the decision tree (e.g., determining a vehicle trajectory and/or object trajectories that an object may take at a future time). Trained models associated with different step sizes can be stored in a catalog and be accessed by a vehicle to improve determinations based at least in part on a decision tree. In some examples, the decision tree can represent a data structure encoded with information about the vehicle, one or more objects, and/or information about the environment. For instance, a same or different machine learned model can generate a decision tree as the vehicle navigates in the environment so that the decision tree represents potential interactions between the vehicle and the one or more objects. By implementing the techniques described herein, a decision tree can be explored in different ways leading to different outcomes from the decision tree that are more representative of how the vehicle and the object(s) interact in a real-world environment.

In some examples, the training component can assign a weight to an output after completion of the step. For example, the training component can assign a first weight to a first output after a first step associated with a first time period and a second weight to a second output after a second step associated with a second time period, and so on in examples when additional steps are included in a tree search. The training component can determine an output by the decision tree (after each of the steps) based on the first weight of the first output and the second weight of the second output. In various examples, a machine learned model can determine a pose, a position, an acceleration, a trajectory, or other data associated with the vehicle in the future based at least in part on applying an algorithm to search the decision tree using the first weight and the second weight.

As mentioned, the training component can train multiple models having different step sizes (e.g., steps of a first model can be 1 second, 1 second, 2 seconds, and 4 seconds and steps of a second model can be 1 second, 1 second, and 6 seconds). As mentioned, models associated with different time horizons (e.g., different steps having different time periods for conducting a portion of a tree search) can be stored in a catalog, database, memory, or other storage device for access by a computing device at a later time. For example, a vehicle computing device can access the first model or the second model from the catalog based at least in part on a speed of the vehicle or a speed of an object being compared to a speed threshold, a density or composition of objects in an environment, a road type (e.g., rural vs urban), or some other reason.

The disclosed techniques can be used to serially determine predictions for a vehicle operation within an environment. In examples, a first prediction (or set or predictions) can be associated with a first time horizon or time step. Within the first time horizon, a second prediction (or set of predictions) may be initiated such that multiple overlapping predictions may be serially generated. Each of these predictions can extend into the future and may differ in length and can be used by a planning component of a vehicle to determine a course of action for the vehicle.

In some examples, a model may define processing resources (e.g., processor amount, processor cycles, processor cores, processor location, processor type, and the like) to use to conduct a search of a decision tree using variable step sizes. A computing device that implements a model may have different processors (e.g., Central Processing Units (CPUs), Graphics Processing Units (GPUs), multi-core processor, and the like). Models may define processing resources to utilize a processor that most efficiently (e.g., uses the least amount of computational time) outputs a prediction. In some examples, models may predict a pose, trajectory or other output by processing the tree search using a GPU, CPU, or a combination thereof. In this way, each model may be defined to utilize the processing resources that enable the model to perform predictions in the least amount of time (e.g., to use the different step sizes in planning considerations of the vehicle). Accordingly, a model can be trained with variable step sizes to make the best use of available processing resources and enable more predictions that may improve how a vehicle navigates in relation to the objects.

As described herein, models may be representative of machine learned models, statistical models, heuristic models, equations, algorithmic representations, maps, or a combination thereof. That is, a model may refer to a machine learning model that learns from a training data set to improve accuracy of an output (e.g., a prediction). Additionally or alternatively, a model may refer to a statistical model that is representative of logic and/or mathematical functions that generate approximations which are usable to make predictions.

The techniques discussed herein may improve a functioning of a vehicle computing device in a number of ways. The vehicle computing device may determine an action for the autonomous vehicle to take based on an output from a decision tree that is searched using variable step sizes to identify potential actions by an object. In some examples, using the variable step prediction techniques described herein, a model may output a vehicle trajectory based on a decision tree that represents potential interactions with an object and improve safe operation of the vehicle by accurately characterizing motion of the object with greater detail as compared to previous models.

The techniques discussed herein can also improve a functioning of a computing device in a number of additional ways. In some cases, evaluating an output by a model(s) may allow an autonomous vehicle to generate more accurate and/or safer trajectories for the autonomous vehicle to traverse an environment. In at least some examples described herein, predictions based on a decision tree may account for object to object dependencies, yielding safer decision-making of the system. In some examples, the model may act as an attention system (e.g., a vehicle safety system and/or a redundancy to an existing perception component) that provides variable step sizes usable to identify and/or detect objects in different types of environments (e.g., dense, sparse, fast moving environments such as a highway, and the like). The techniques can include the model optimizing available computational resources by performing operations that limit the impact on the available resources (as compared to not implementing the model). For example, a model can be selected to make efficient use of available computational resources while also providing a prediction over a given time horizon (e.g., different models having different step sizes utilize different amounts of available computational resources). Utilizing variable step size data and/or variable time horizons by a vehicle computing device, for instance, can improve the accuracy and/or reduce a latency for the vehicle to respond to a potential collision in the environment. These and other improvements to the functioning of the computing device are discussed herein.

In some examples, the variable step size determination techniques discussed herein may reduce training time by training in parallel and/or improve accuracy by reducing an amount of data to be stored. Further, such techniques provide for training networks based on larger datasets than would otherwise not be enabled due to, for example, limitations of memory, processing power, etc. (thereby creating more robust learned networks in shorter amounts of time).

The methods, apparatuses, and systems described herein can be implemented in a number of ways. Example implementations are provided below with reference to the following figures. Although discussed in the context of an autonomous vehicle in some examples below, the methods, apparatuses, and systems described herein can be applied to a variety of systems. In one example, machine learned models may be utilized in driver-controlled vehicles in which such a system may provide an indication of whether it is safe to perform various maneuvers. In another example, the methods, apparatuses, and systems can be utilized in an aviation, nautical, manufacturing, agricultural, etc. context. Additionally, or alternatively, the techniques described herein can be used with real data (e.g., captured using sensor(s)), simulated data (e.g., generated by a simulator), or any combination thereof.

FIG. 1 is an illustration of an example environment 100, in which an example computing device 102 implements a training component 104 to predict step sizes for searching a decision tree. For instance, the training component 104 can generate output data 106 representing time periods for different steps of a search to determine an output from the decision tree that is usable by an autonomous vehicle (vehicle 108) in the example environment 100.

The computing device 102 can implement the training component 104 to train a machine learned model to output time periods for different steps of a tree search. For instance, at least some steps can be associated with different periods of time of the tree search. In various examples, a first step can be followed by a subsequent step that uses an output from a first step as input. By way of example and not limitation, the training component 104 can represent a machine learned model such as a Recurrent Neural Network (RNN) that is trained to generate the output data 106 which can represent vehicle state data and hidden states.

The computing device 102 can be remote from the vehicle 108 as shown in FIG. 1, however, in other examples, the computing device 102 can be included in the vehicle 108. In some examples, the prediction techniques described herein may be implemented at least partially by or in association with a vehicle computing device (e.g., vehicle computing device 604) and/or a remote computing device (e.g., computing device(s) 650).

Generally, the training component 104 provides functionality to train a machine learned model to generate the output data 106 representing one or more of: time periods for searching a decision tree, vehicle state data at a future time, hidden state data associated with a step of the search, and the like. In some examples, vehicle data can refer to a combination of data associated with the vehicle including the vehicle state data, hidden state data, and the like. In various examples, the training component 104 may be implemented to train the model component 110, or other component or model of the vehicle 108 that uses a decision tree to determine an output. Training data may include a wide variety of data, such as image data, video data, lidar data, radar data, audio data, other sensor data, etc., that is associated with a value (e.g., a desired classification, inference, prediction, etc.). In some examples training data can comprise determinations based on sensor data, such as a bounding boxes (e.g., two-dimensional and/or three-dimensional bounding boxes associated with an object), segmentation information, classification information, an object trajectory, and the like. Such training data may generally be referred to as a "ground truth." To illustrate, the training data may be used for image classification and, as such, may include sensor data representing an environment proximate an autonomous vehicle and that is associated with one or more classifications. In some examples, such a classification may be based on user input (e.g., user input indicating that the image depicts a specific type of object) or may be based on the output of another machine learned model. In some examples, such labeled classifications (or more generally, the labeled output associated with training data) may be referred to as "ground truth". Training the model component 104 can improve vehicle trajectory determinations over time by learning how to use variable step sizes of the decision tree to produce an optimized result.

As mentioned, the output data 106 can include hidden state data associated with a step of the search. In some examples, the training component 104 can train an RNN that, during training, generates hidden states after completion of each step of the search. In some examples, the hidden states remain constant until the end of a step (e.g. a 4 second step size does not require computing hidden states after the first, second, or third second of the search but instead only after the fourth second thereby saving computational resources over techniques that compute hidden states using fixed step sizes). For example, at least some hidden states may not be computed during a decision tree search using the techniques described herein. By having a step size that is longer than 1 second, for example, fewer hidden states are determined within a step regardless of whether hidden states are updated between corresponding steps. Further discussion of hidden states can be found throughout this disclosure including in FIG. 4. In other examples that do not include an RNN, hidden states may not be required for training a machine learned model.

As illustrated, the vehicle 108 includes a model component 110 configured to predict a vehicle trajectory and/or an object trajectory of an object in the environment. The model component 110 can represent one or more machine learned models for processing various types of input data (e.g., feature vectors, top-down representation data, sensor data, map data, etc.) associated with the one or more objects in the environment 100, and determine output data 112 representing one or more of: an object trajectory (ies), a vehicle trajectory(ies), an occupancy map(s), scene data for use in a simulation, and/or a probability of an intersection between an object and the vehicle 108.

In some examples, the functionality of the training component 104 and the functionality of the model component 110 can be included in one of the training component 104 or the model component 110, or in a different single component.

In some instances, the vehicle 108 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 108 may be a fully or partially autonomous vehicle having any other level or classification.

In various examples, a vehicle computing device associated with the vehicle 108 may be configured to detect one or more objects (e.g., object 114 and object 116) in the environment 100, such as via a perception component. In some examples, the vehicle computing device may detect the objects, based on sensor data received from one or more sensors. In some examples, the sensors may include sensors mounted on the vehicle 108, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. In various examples, the vehicle 108 may be configured to transmit and/or receive data from other autonomous vehicles and/or the sensors. The data may include sensor data, such as data regarding the objects detected in the environment 100.

In various examples, the vehicle computing device can receive the sensor data and can semantically classify the detected objects (e.g., determine an object type), such as, for example, whether the object is a vehicle, such as object 114, a pedestrian such as object 116, a building, a truck, a motorcycle, a moped, or the like. The objects may include static objects (e.g., buildings, bridges, signs, etc.) and dynamic objects such as other vehicles, pedestrians, bicyclists, or the like. In some examples, a classification may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of the object may be used by a model to determine object characteristics (e.g., maximum speed, acceleration, maneuverability, etc.). In this way, potential trajectories by an object may be considered based on characteristics of the object (e.g., how the object may potentially move in the environment).

Generally, the model component 110 provides functionality to determine a first object trajectory 118 and a second object trajectory 120 associated with the object 114, and determine a vehicle trajectory 122 associated with the vehicle 108. The model component 110 can also or instead predict use a decision tree to generate a scene for a simulation and/or to predict intersection probabilities for the vehicle 108 to intersect with the object 114 and/or the object 116. For instance, the model component 104 can output one or more trajectories usable in a simulation (also referred to as a scenario or estimated states) to determine a response by the vehicle 108 to the object. In some examples, the model component 110 can generate the output data 112 to represent one or more heat maps. In some examples, the one or more predicted trajectories may be determined or represented using a probabilistic heat map to predict object behavior, such as that described in U.S. patent application Ser. No. 15/807,521, filed Nov. 8, 2017, entitled "Probabilistic Heat Maps for Behavior Prediction," which is incorporated herein by reference in its entirety and for all purposes.

In various examples, the model component 110 may be configured to determine an initial position of each object in an environment (e.g., a physical area in which a vehicle operates and/or a simulated environment) indicated by the sensor data. Each determined or predicted trajectory may represent a potential direction, speed, and acceleration that the object may travel through the environment 100. The object trajectories predicted by the model component 110 (e.g., the object trajectories 118 and 120) described herein may be based on passive prediction (e.g., independent of an action the vehicle and/or another object takes in the environment, substantially no reaction to the action of the vehicle and/or other objects, etc.), active prediction (e.g., based on a reaction to an action of the vehicle and/or another object in the environment), or a combination thereof.

In some examples, the training component 104 and/or the model component 110 may be configured to receive input data representing features of the environment (e.g., a roadway, a crosswalk, a building, etc.), a current state of an object (e.g., the vehicle 114 and/or the pedestrian 116), and/or a current state of the vehicle 108. Additional details about inputs to the model component 110 are provided throughout this disclosure.

The output data 112 from the model component 110 can be used by a vehicle computing device in a variety of ways. For instance, information about the object trajectories, object intents, and/or sampling conditions can be used by a planning component of the vehicle computing device to control the vehicle 108 in the environment 100 (e.g., determine a trajectory and/or control a propulsion system, a braking system, or a steering system). The output data 112 may also or instead be used to perform a simulation by setting up conditions (e.g., an intersection, a number of objects, a likelihood for the object to exhibit abnormal behavior, etc.) for use during the simulation such as to test a response by a vehicle safety system.

The model component 110 can determine the output data 112 based at least in part on applying a tree search algorithm to the decision tree. For example, the tree search algorithm can execute functions associated with various nodes and sub-nodes to identify a path between nodes having a smallest cost among various paths (including different nodes to represent an object intent, an object trajectory, or a vehicle action, for example). A set of steps can test various potential interactions between the vehicle 108 and the objects in the environment 100. For example a first node of the decision tree can include an object intent (e.g., a left turn) associated with an object, and a second node can include a set of object intents associated with the object.

In some examples, a first object intent of a first object can be associated with a first node and a second object intent of a second object can be associated with a second node (e.g., a decision tree can include two or more objects each having one or more intents). Additional examples of determining nodes and samples of a decision tree can be found, for example, in U.S. patent application Ser. No. 17/900,658 titled "Trajectory Prediction based on a Decision Tree" and filed Aug. 31, 2022, the entirety of which is herein incorporated by reference in its entirety and for all purposes.

In some examples, the vehicle computing device may implement the model component 110 to predict a future characteristic (e.g., a state, an action, etc.) for an object (e.g., a bicycle, a pedestrian, another vehicle, an animal, etc.) that may result in an impact to operation of an autonomous vehicle. For instance, a machine learned model may determine multiple trajectories (e.g., direction, speed, and/or acceleration) for an object to follow in an environment at a future time. In such an example, a vehicle computing device of the vehicle 108 may predict a candidate trajectory for the vehicle (using a same or different model) with consideration to an output (e.g., the object trajectories) from the machine learned model thereby improving vehicle safety by providing the vehicle with a trajectory that is capable of safely avoiding the potential future positions of the object that may impact operation of the vehicle (e.g., intersect a trajectory of the vehicle, cause the vehicle to swerve or brake hard, etc.).

In some examples, the model component 110 can implement a decision tree that evaluates future positions of multiple objects in a simulated environment to determine a response by the vehicle 108 to the objects including various levels of responsiveness by one or more of the objects. In some examples, a vehicle computing device can control the vehicle in a real-world environment based at least in part on the response.

In some examples, the training component 104 and/or the model component 110 may receive data associated with one or more objects in the environment for generating the decision tree. For instance, the training component 104 and/or the model component 110 may receive (or in some examples determine) one or more of: position data, orientation data, heading data, velocity data, speed data, acceleration data, yaw rate data, or turning rate data associated with the object at various times. In various examples, the model component 110 can determine a rate of braking, steering, or acceleration for the object to operate in the environment and/or take an action relative to the vehicle based at least in part on the data. For example, the object can be associated with different thresholds for maximum braking, maximum acceleration, maximum steering rate, and the like, thereby capturing different potential behaviors by the object (e.g., the object can react with different levels of attentiveness to the vehicle).

In various examples, the decision tree can determine actions for the vehicle 108 to take while operating (e.g., trajectories to use to control the vehicle) based on one or more outputs by the decision tree. For example, the decision tree can include a node for potential vehicle actions. The actions may include a reference action (e.g., one of a group of maneuvers the vehicle is configured to perform in reaction to a dynamic operating environment) such as a right lane change, a left lane change, staying in a lane, going around an obstacle (e.g., double-parked vehicle, a group of pedestrians, etc.), or the like. The actions may additionally include sub-actions, such as speed variations (e.g., maintain velocity, accelerate, decelerate, etc.), positional variations (e.g., changing a position in a lane), or the like. For example, an action may include staying in a lane (action) and adjusting a position of the vehicle in the lane from a centered position to operating on a left side of the lane (sub-action).

For each applicable action and sub-action, the vehicle computing device may implement different model(s) and/or component(s) to simulate future states (e.g., estimated states) by projecting an autonomous vehicle and relevant object(s) forward in the environment for the period of time (e.g., 5 seconds, 8 seconds, 12 seconds, etc.). The model(s) may project the object(s) (e.g., estimate future positions of the object(s)) forward based on a predicted trajectory associated therewith. The model(s) may predict a trajectory of a vehicle and predict attributes about the vehicle including whether the trajectory will be used by the vehicle to arrive at a predicted location in the future. The vehicle computing device may project the vehicle (e.g., estimate future positions of the vehicle) forward based on the vehicle trajectories or actions output by the model (with consideration to multiple object intents). The estimated state(s) may represent an estimated position (e.g., estimated location) of the autonomous vehicle and an estimated position of the relevant object(s) at a time in the future. In some examples, the vehicle computing device may determine relative data between the autonomous vehicle and the object(s) in the estimated state(s). In such examples, the relative data may include distances, locations, speeds, directions of travel, and/or other factors between the autonomous vehicle and the object. In various examples, the vehicle computing device may determine estimated states at a pre-determined rate (e.g., 10 Hertz, 20 Hertz, 50 Hertz, etc.). In at least one example, the estimated states may be performed at a rate of 10 Hertz (e.g., 80 estimated intents over an 8 second period of time).

In various examples, the vehicle computing device may store sensor data associated with an actual location of an object at the end of the set of estimated states (e.g., end of the period of time) and use this data as training data to train one or more models. For example, stored sensor data (or perception data derived therefrom) may be retrieved by a model and be used as input data to identify cues of an object (e.g., identify a feature, an attribute, or a pose of the object). Further, detected positions over such a period of time associated with the object may be used to determine a ground truth trajectory to associate with the object. In some examples, the vehicle computing device may provide the data to a remote computing device (i.e., computing device separate from vehicle computing device such as the computing device 102 and the computing device(s) 650 for data analysis. In such examples, the remote computing device may analyze the sensor data to determine one or more labels for images, an actual location, yaw, speed, acceleration, direction of travel, or the like of the object at the end of the set of estimated states. In some such examples, ground truth data associated with one or more of: positions, trajectories, accelerations, directions, and so may be determined (either hand labelled or determined by another machine learned model) and such ground truth data may be used to determine a step size and/or a trajectory for the vehicle 108. In some examples, corresponding data may be input into the model to determine an output (e.g., a trajectory, and so on) and a difference between the determined output, and the actual action by the object (or actual trajectory) may be used to train the model.

Figure 2:
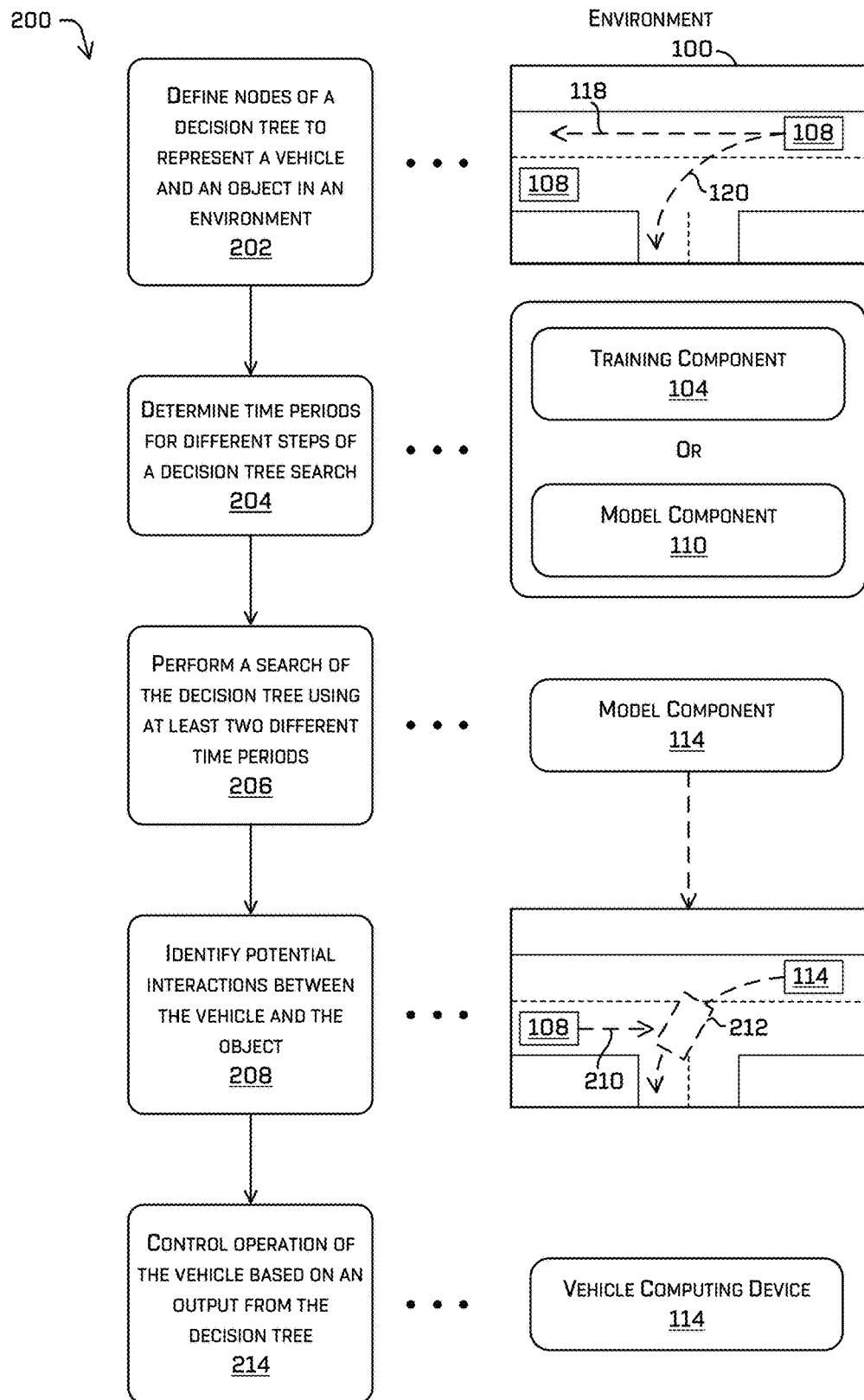
FIG. 2 is a pictorial flow diagram of an example process for controlling an example vehicle based on exploring a decision tree using variable step sizes output from an example trained model.

FIG. 2 is a pictorial flow diagram of an example process 200 for controlling an example vehicle (e.g., vehicle 108 or vehicle 602) based on searching a decision tree using variable step sizes output from an example trained model. The example process 200 may be implemented by a computing device such as the computing device 102 of FIG. 1, the vehicle computing device 604, and/or the vehicle safety system 634 of FIG. 6. In some examples, the techniques described in relation to FIG. 2 can be performed as the vehicle 108 navigates in the environment 100 (e.g., a real-world environment or a simulated environment).

An operation 202 can include defining nodes of a decision tree to represent a vehicle and an object in an environment. In some examples, defining a node can include generating a node to represent an object intent, a vehicle position, a vehicle action, traffic claws, etc. For example, a first node (or object intent thereof) of the decision tree can represent a characteristic (e.g., a state or an action) of an object such as one or more of: a yield action, a drive straight action, a left turn action, a right turn action, a brake action, an acceleration action, a steering action, or a lane change action, and a second node can represent an action or state associated with the vehicle 108 (e.g., one of: a yield action, a drive straight action, a left turn action, a right turn action, a brake action, an acceleration action, a steering action, or a lane change action).

In some examples, the operation 202 can include the vehicle 108 implementing the model component 110 to associate a first node with a vehicle action, a second node with a second vehicle action, a third node with a first object intent, a fourth node with a second object intent, and so on. The decision tree can represent one or more objects (e.g., the vehicle 108) in the environment 100 (e.g., a simulated environment or a real-world environment). For example, additional nodes can represent an action, state, and/or intent of an additional object, and so on. In some examples, a single node can represent potential interactions between two or more objects relative to one another and/or relative to the vehicle.

In various examples, the computing device can generate the decision tree based at least in part on state data associated with a vehicle and/or object(s). The state data can include data describing an object (e.g., the vehicle 114, the pedestrian 116 in FIG. 1) and/or a vehicle (e.g., vehicle 108) in an environment. The state data can include, in various examples, one or more of position data, orientation data, heading data, velocity data, speed data, acceleration data, yaw rate data, or turning rate data associated with the object and/or the vehicle.

An operation 204 can include determining time periods for different steps of a decision tree search. For example, the operation 204 can include the vehicle 108 implementing the model component 110 to execute a search of the decision tree using time periods for steps output by a trained machine learned model. Additionally or alternatively, the operation 204 can include the computing device 102 implementing the training component 104 to determine steps sizes having corresponding outputs that collectively represent an output by the decision tree. For instance, the search can be performed in steps and each step can have an independent time period for exploring a branch or a node of the decision tree. A step associated with a longer time period relative to a time period associated with another step can perform a more in depth search of a node or a branch (e.g., more time to explore the branch).

In some examples, the operation 204 can include the model component 110 determining a compute cost for implementing different available models, and selecting a model to perform a search of a decision tree based on the compute cost. For example, each of the available models can be associated with a different time (e.g., a first model for 1 second, a second model for 2 seconds, etc.) such that a prediction component can call for the first model to perform a first search of the decision tree and the second model to perform a second search of the decision tree. For instance, a model can be called by the prediction component, planning component, or other component of a vehicle component computing device based on using an output of the first search as an input to dynamically change between models from one step to another step to implement different time steps. In some examples, the model component 110 can determining a time horizon for a prediction based at least in part on sensor data from one or more sensors associated with the vehicle 108, and select a model that has a time period equal to the determined time horizon.

In various examples, the model component 110 can determine that there are N number of objects in an environment, and further determine that M amount of processing and/or memory resources are available for performing a prediction (where N and M are integers). In some examples, the model component 110 can receive or otherwise determine a number of object in the environment based at least in part on sensor data associated with the vehicle 108, and receive an indication of a time horizon associated with a prediction. By way of example and not limitation, the model component 110 can select a model for a 4 second prediction in the future that utilizes step sizes that adhere to our available processing and/or memory resources. In some examples, different models can be selected (e.g., a 1 second model, a 1 second model, and a 2 second model, a 1 second model and a 3 second model, or the like) that not only meet the 4 second prediction time, but also can provide useful output data using the available computational resources.

In some examples, the model component can assign weights to different models such that a 1 second model is associated with a first weight, a 2 second model is associated with a second weight, and so on. Generally, a shorter time step can be associated with a higher weight. The weights for each model can cause an output by each model to be considered differently when determining an output of the decision tree.

In some examples, each of the available models can be associated with a set of time periods in which each time period corresponds to a different step. For example, a first model can include a first time period for a first step, a second time period for a second step, and so on for a number of steps associated with a tree search. In some examples, the model component 110 can represent a planning component or a prediction component that determines an amount of time for receiving a prediction in the future (e.g., 8 seconds). In various examples, the model component 110 can call for the first model to perform a search using a first set of time periods (e.g., a single model can indicate searching a decision tree using two 1 second step sizes followed by a 2 second step size and a 4 second step size for a total of 8 seconds while another model can represent a different set of time periods that total 8 seconds). In this way, time periods for different steps can vary over a fixed time. The model component 110 can select a model from a database of available models to make efficient use of available computation resources. For example, as mentioned the compute cost for a model can vary because of the variable step sizes associated with each model, and the model that makes for the most efficient use of computation resources can be selected for searching the decision tree.

In examples, step size(s) may also or alternatively be selected based on environmental factors such as a scene density, historic traffic patterns, weathering or other environmental conditions, object types, etc. For example, a longer step may be selected for a scene in which little change is anticipated (e.g., if a vehicle is driving in an empty area such as a field where little external change is expected or while operating on roads that historically experience little traffic). In other examples, a vehicle may be operating in a dense urban environment which may corresponding to relatively short time steps to ensure more accurate modeling of the environment and reduced response times.

The model component 110 can also or instead assign a weight to each step size based at least in part on the time period associated with the step size. For example, a 1 second step size can be associated with a first weight while a 2 second step size can be associated with a second weight, and so on for a number of steps. The model component 110 can determine output data based at least in part on the weights, as described throughout this disclosure.

An operation 206 can include performing a search of the decision tree using at least two different time periods. For example, the operation 206 can include the vehicle 108 implementing the model component 110 to determine an output of the decision tree based on performing a first step for a first period of time and a second step for a second period of time different form the first period of time. In various examples, the decision tree can be encoded to consider vehicle control policies, object control policies, map data, environment data, and the like. The decision tree can, for example, represent a discrete selection or combination of potential interactions from various sets of possibilities (e.g., a particular scenario with street intersections, traffic rules, multiple objects having different intents, and so on). Each step can explore a different branch or node, or depth within a branch or node. Some nodes of the decision tree can, for instance, represent various types of object behavior to capture potential actions by the object that are both likely (e.g., the object goes straight using trajectory 118) and unlikely (e.g., the object turns in front of the vehicle unexpectedly using the trajectory 120).

An operation 208 can include identifying potential interactions between the vehicle and the object. For example, the operation 208 can include exploring the decision tree for different step sizes to identify that the object 114 can intersect with a vehicle trajectory 210 as shown by the object representation 212 along the object trajectory 120 at a future time. The vehicle trajectory 210 can be determined by a planning component of a vehicle computing device, or the model component 110, for example.

An operation 214 can include controlling operation of the vehicle based on an output from the decision tree. For example, the operation 214 can include the vehicle computing device determining a cost, or weight, for an output after each respective step, and aggregating the costs (e.g., weighted average, etc.) to determine an overall output by the decision tree (e.g., a candidate vehicle trajectory for sending to the planning component of the vehicle computing device). In such examples, the output of the decision tree can be based at least in part on a lowest cost to traverse the decision tree.

Figure 3:
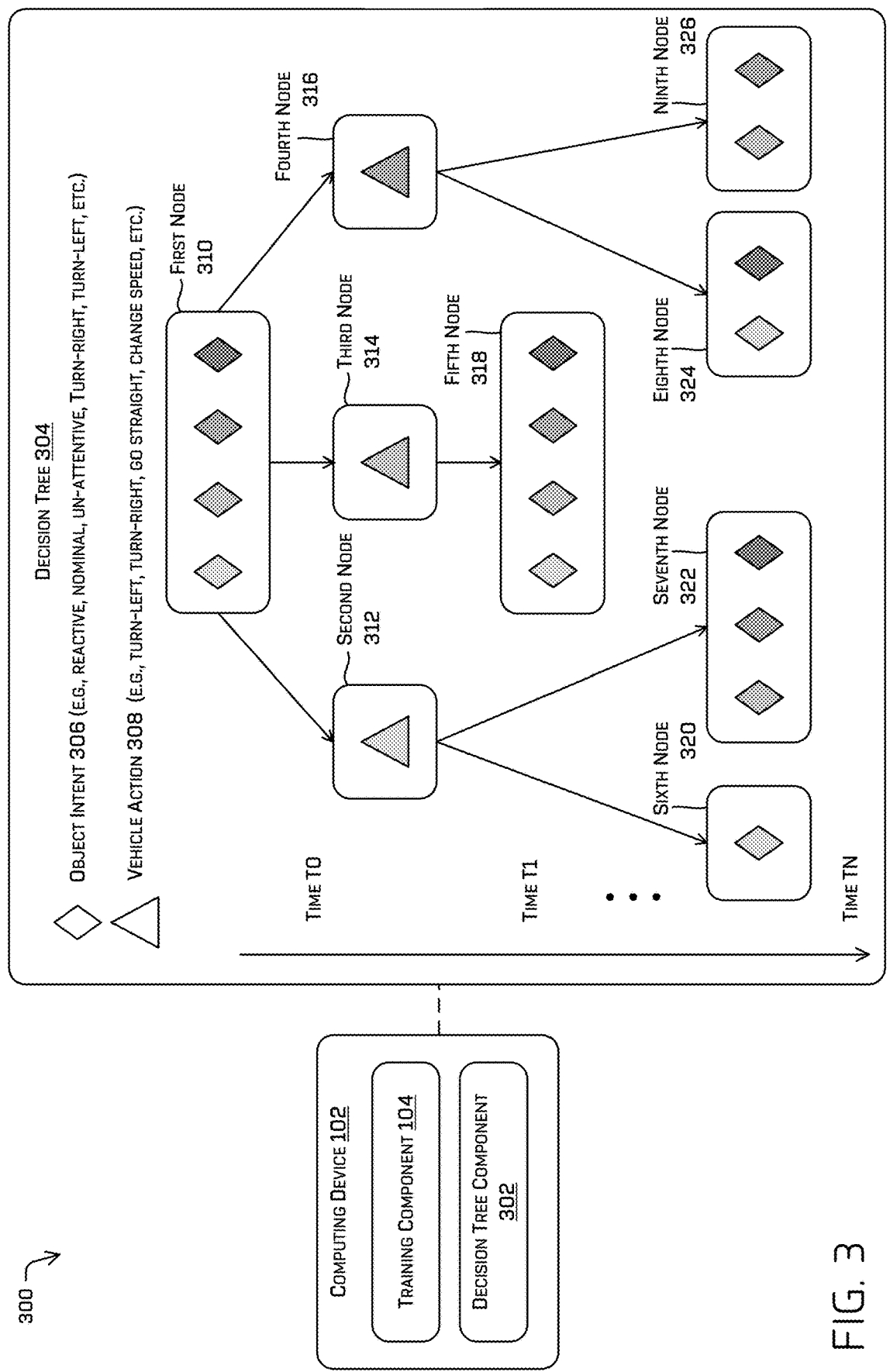
FIG. 3 illustrates an example block diagram of an example computer architecture for implementing techniques to train a machine learned model to output step sizes for searching an example decision tree.

FIG. 3 illustrates an example block diagram 300 of an example computer architecture for implementing techniques to train a machine learned model to output step sizes for searching an example decision tree. The example 300 includes a computing device 102 of FIG. 1 comprising the training component 104 and a decision tree component 302 configured to generate a decision tree 304. In some examples, the techniques described in relation to FIG. 3 can be performed by a vehicle computing device (e.g., the vehicle computing device(s) 604) as the vehicle 108 navigates in the environment 100.

In various examples, the computing device 102 can implement the decision tree component 302 to determine the decision tree 304 representing different potential scenarios between the vehicle 108 and an object(s) (e.g., the object 114 and the object 116). For example, the decision tree 304 can indicate a control policy for the vehicle and/or the object(s) in the environment as well as traffic rules, signal information, or other map features of the environment. In some examples, a node of the decision tree can indicate an attribute (e.g., position, class, velocity, acceleration, yaw, turn signal status, etc.) of an object, history of the object (e.g., location history, velocity history, etc.), an attribute of the vehicle (e.g., velocity, position, etc.), crosswalk permission, traffic light permission, and the like. In various examples, the decision tree 304 can represent scenarios that include a potential intersection with an object, and optionally, a vehicle trajectory to avoid the potential intersection.

In some examples, the decision tree component 304 can be configured to manage nodes of the decision tree 304 including determining a number of nodes and/or types of intents, adding a node, removing a node, etc. As shown, the decision tree 304 comprises one or more object intents 306 (e.g., a future action) and one or more vehicle actions 308 (e.g., a turning action, braking action, acceleration action such as yielding to or slowing for an object to safely enter in front of the vehicle). Object intents can represent a level of attentiveness of the object, such as whether the object will react to the vehicle with a first level of reactiveness or a second level of reactiveness, or in some cases, not react to the vehicle during a sample. In various examples, different levels of reactiveness can be associated with different maximum thresholds for the object to accelerate, brake, or steer. The object intent 306 can include, for example, one or more of: a) a reactive intent in which an object changes lanes, brakes, accelerates, decelerates, etc. relative to the vehicle, b) a nominal intent in which the object changes lanes, brakes, accelerates, decelerates, etc. less aggressively than the reactive intent such as decelerate to allow the vehicle to lane change, c) an un-attentive intent in which the object refrains from reacting to the vehicle, d) a right turn intent, e) a left turn intent, f) a straight intent, g) an accelerating intent, h) a decelerating intent, i) a parking intent, j) a remain in place intent, etc.).

In some examples, a node(s) of the decision tree 304 can be associated with one or more regions surrounding the vehicle (e.g., a region most likely to include a potential intersection point with an object. For example, the decision tree component 302 can receive one or more regions by the model component 110, or another machine learned model, configured to identify a relevant region from among a set of regions in an environment of the vehicle. For instance, the decision tree 304 can include node(s) to represent an occluded region, a region in front of the vehicle, or other area within a predetermined distance of the vehicle. In some examples, the vehicle is a bi-directional vehicle, and as such, the model component 110 can define, identify, or otherwise determine the rear region relative to a direction of travel as the vehicle navigates in the environment. For instance, the rear region of the vehicle can change depending upon the direction of travel. In at least some examples, the environment may be encoded as a vector representation and output from a machine learned model as an embedding. Such an embedding may be used in predicting the future state(s) or intent(s) of the object.

FIG. 3 depicts the decision tree 304 comprising a first node 310, a second node 312, a third node 314, a fourth node 316, a fifth node 318, a sixth node 320, a seventh node 322, an eighth node 324, and a ninth node 326, though other number of nodes are possible. For instance, the first node 310 can include four different object intents as depicted by different shading. The second node 312, the third node 314, and the fourth node 316 can be associated with corresponding vehicle actions (e.g., a proposed action or action for the vehicle to take in the future). In various examples, the second node 312, the third node 314, and/or the fourth node 316 can represent actions for applying to the vehicle over a period of time.

In the example illustrated, intents grouped together may either elicit a similar or same response from the vehicle and/or have substantially similar probabilities/confidences/likelihoods of occurrence. As illustrated, taking certain actions by the vehicle may aid in differentiating a response of the object as illustrated by varying groupings of object intents in response to vehicle actions. Further differentiation of the object intents may, in some instances, yield better responses by the vehicle to the environment (e.g., safer, more efficient, more comfortable, etc.).

The decision tree 304 is associated with a period of time as shown in FIG. 3. For example, time T0 represents a first time of the decision tree 304 and is generally associated with the first node 310 and the second node 312. Each progression of the decision tree 304 to a new node does not necessarily imply a new time (e.g., T0, T1, etc. is not scaled to the nodes in FIG. 3 but used to show a progression of time generally). In some examples, each layer of the decision tree can be associated with a particular time (e.g., the first node 310, the second node 312, the third node 314, and the fourth node 316 are associated with time T0, the fifth node 318, the sixth node 320, the seventh node 322, the eighth node 324, and the ninth node 326 are associated with time T1, and so on for additional branches or nodes (not shown) up to time TN, where N is an integer. In various examples, different layers, branches, or nodes can be associated with different times in the future. In various examples, scenarios associated with one or more of the nodes of the decision tree 304 can run in parallel on one or more processors (e.g., Graphics Processing Unit (GPU) and/or Tensor Processing Unit (TPU), etc.).

In various examples, the decision tree component 302 can generate the decision tree 304 based at least in part on one or more of: an attribute (e.g., position, velocity, acceleration, yaw, etc.) of the object 114, history of the object 114 (e.g., location history, velocity history, etc.), an attribute of the vehicle 108 (e.g., velocity, position, etc.), and/or features of the environment (e.g., roadway boundary, roadway centerline, crosswalk permission, traffic light permission, and the like). In some examples, a node of the decision tree 304 can be associated with various costs (e.g., comfort cost, safety cost, distance cost, brake cost, obstacle cost, etc.) usable for determining a potential intersection point between the vehicle and the object in the future.

In some examples, the computing device 102 can implement the decision tree component 302 to generate the decision tree 304 based at least in part on state data associated with the vehicle and one or more objects in an environment. The state data can include data describing an object(s) (e.g., the vehicle 114, the pedestrian 116 in FIG. 1) and/or a vehicle (e.g., vehicle 108) in an environment, such as in example environment 100. The state data can include, in various examples, one or more of position data, orientation data, heading data, velocity data, speed data, acceleration data, yaw rate data, or turning rate data associated with the object(s) and/or the vehicle.

In some examples, the decision tree component 304 can use a heuristic and/or a machine learned model to determine whether to expand a branch or node of the decision tree 304. For instance, the machine learned model can be trained to determine whether to expand child branch/node, group portions of all intents, expand leaf node upper and lower bounds for determining optimal trajectory.

Figure 4:
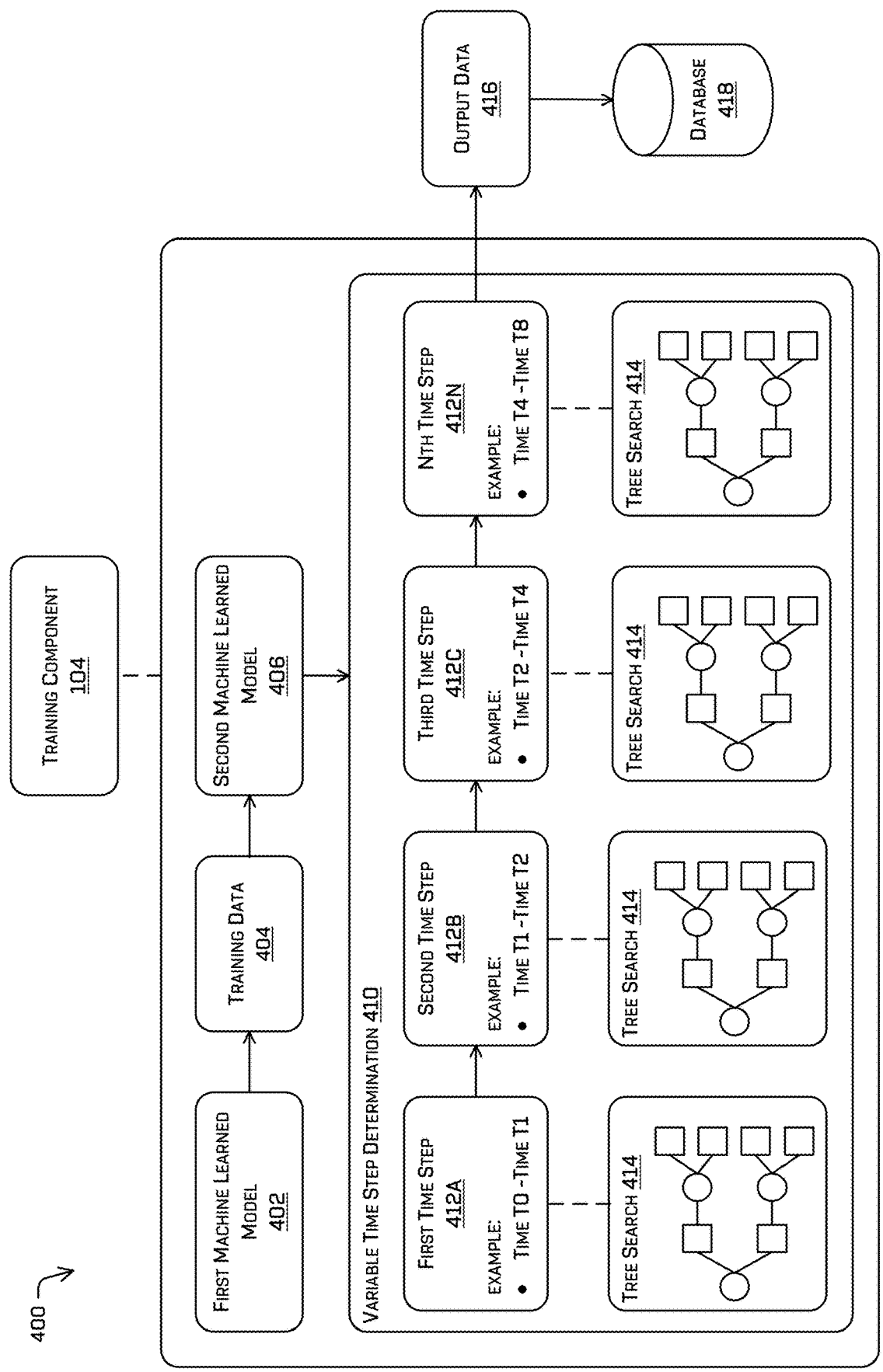
FIG. 4 illustrates an example block diagram of an example computer architecture for implementing techniques to train a machine learned model to output step sizes for searching an example decision tree.

FIG. 4 illustrates an example block diagram 400 of an example computer architecture for implementing techniques to train a machine learned model to output step sizes for searching an example decision tree. The techniques described in the example 400 may be performed by a computing device such as the computing device 102, the vehicle computing device(s) 604, and/or the computing device(s) 650.

A first machine learned model 402 can output training data 404 for use as input data to a second machine learned model 406. The first machine learned model 402 can be configured to receive input data (e.g., log data, sensor data, map data, object state data, vehicle state data, control policy data, etc.) and search a decision tree using a first search algorithm associated with a fixed step size. The first tree search algorithm can, for example, initiate one or more scenarios for determining future positions of a vehicle and surrounding objects. Thus, the tree search can represent various potential interactions between an object relative to another object and/or an object relative to an autonomous vehicle. In some examples, the training component 104 can train the second machine learned model 406 without requiring fixed step size data from the first machine learned model 402.

In some examples, the second machine learned model 406 can perform variable time step determination 410 which includes a first time step 412A, a second time step 412B, a third time step 412C, up to an Nth time step 412N (collectively referred to as "time steps 412"), where N in an integer. As shown in FIG. 4, the time steps 412 are associated with a tree search 414, though each time step corresponds to searching a different portion of the tree search 414 (e.g., the time steps 412 make up the tree search 414). In some examples, the time step determination 410 can include determining costs associated with a scenario, and aggregating the costs (e.g., weighted average, etc.) of a node or multiple modes of the decision tree. In some examples, a node of the decision tree 304 can be associated with various costs (e.g., comfort cost, safety cost, distance cost, brake cost, obstacle cost, etc.) usable for determining a potential intersection point between the vehicle and the object in the future.

After completion of the last time step, the tree search 414 can generate output data 416 representing a sum of the outputs from the time steps 412. For instance, the first time step 412A can be associated with a first time period that is the same as the second time step 412B (1 second), whereas the third time step 412C can be for time T2-time T4 (two seconds). The Nth time step 412N can, for example, represent a fourth and final step from time T4-time T8 (four seconds). The output data 416 can include a length of time for each of the time steps (1 s, 1 s, 2 s, 4 s in the illustrated example), and the variable time steps can be stored in database 418 for access at a later time.

The time step determination 410 can repeat to generate various models having different variable time step sequences. For example, different numbers of steps and time periods for each of the step can be stored in the database 418 for access by another computing device (e.g., the vehicle computing device 604 to control the vehicle 602, the computing device(s) 650 to train the second machine learned model 406). In some examples, the database 418 can be included in a vehicle (e.g., the vehicle 108 or the vehicle 602) for providing models that cause the vehicle to navigate in an environment.

Figure 5:
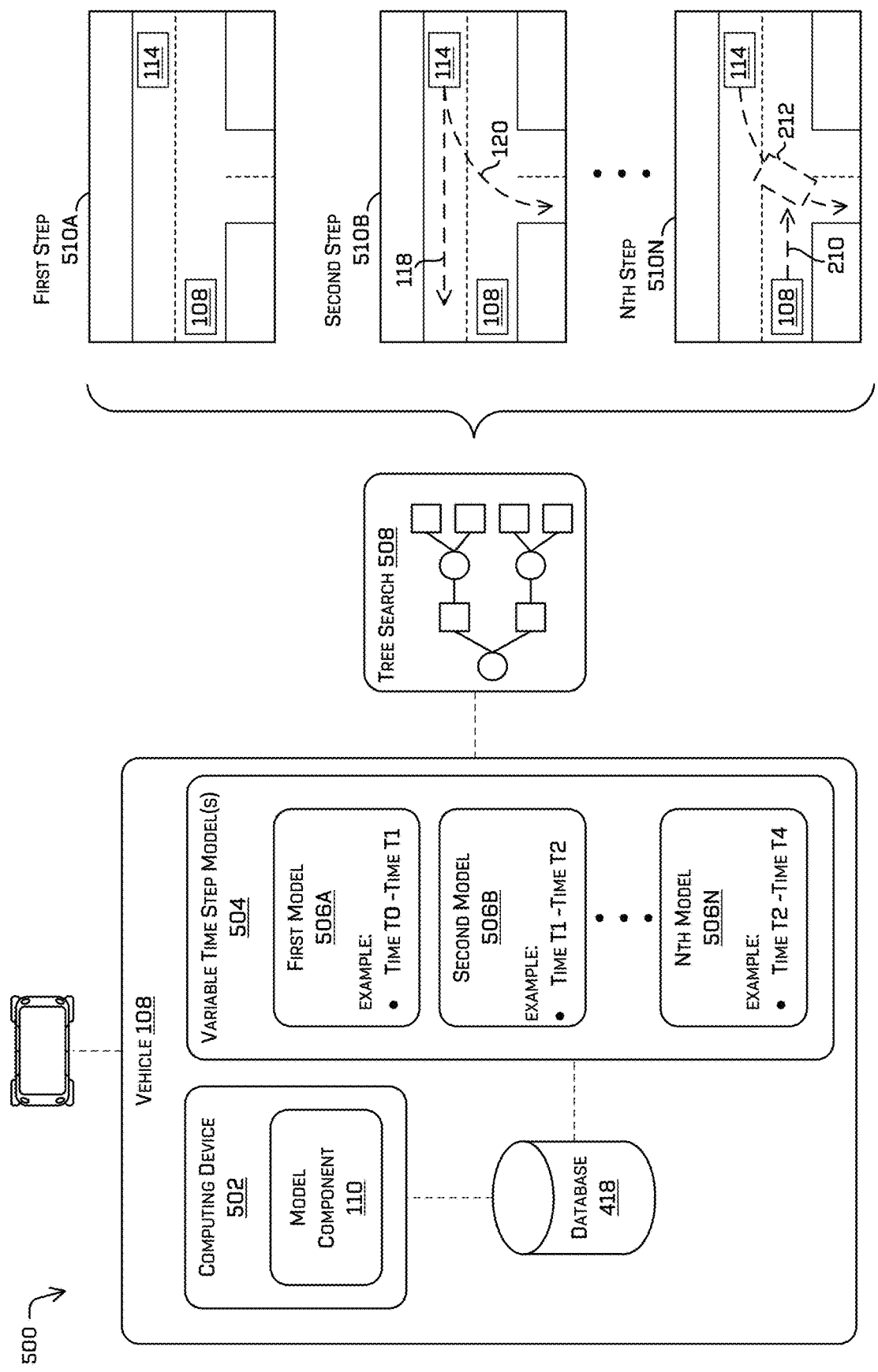
FIG. 5 illustrates an example block diagram of an example computer architecture for an example vehicle to access variable time step models for determining an action by the example vehicle.

FIG. 5 illustrates an example block diagram 500 of an example computer architecture for an example vehicle to access variable time step models for determining an action by the example vehicle. The techniques described in the example 500 may be performed by a computing device 502 which can represent the vehicle computing device(s) 604, the computing device(s) 650 of FIG. 6, or the computing device 102 of FIG. 1.

The vehicle 108 can access one or more variable time step model(s) 504 from the database 418 including the first model 506A, the second model 506B, up to the Nth model 506N, where N is an integer. In some examples, the computing device 502 can implement the model component 110 to apply one or more of the variable time step model(s) 504 to a tree search 508. The tree search 508 can include a first step 510 A, a second step B, up to an Nth step 510N, (collectively referred to as "the steps 510") where N is an integer.

Figure 6:
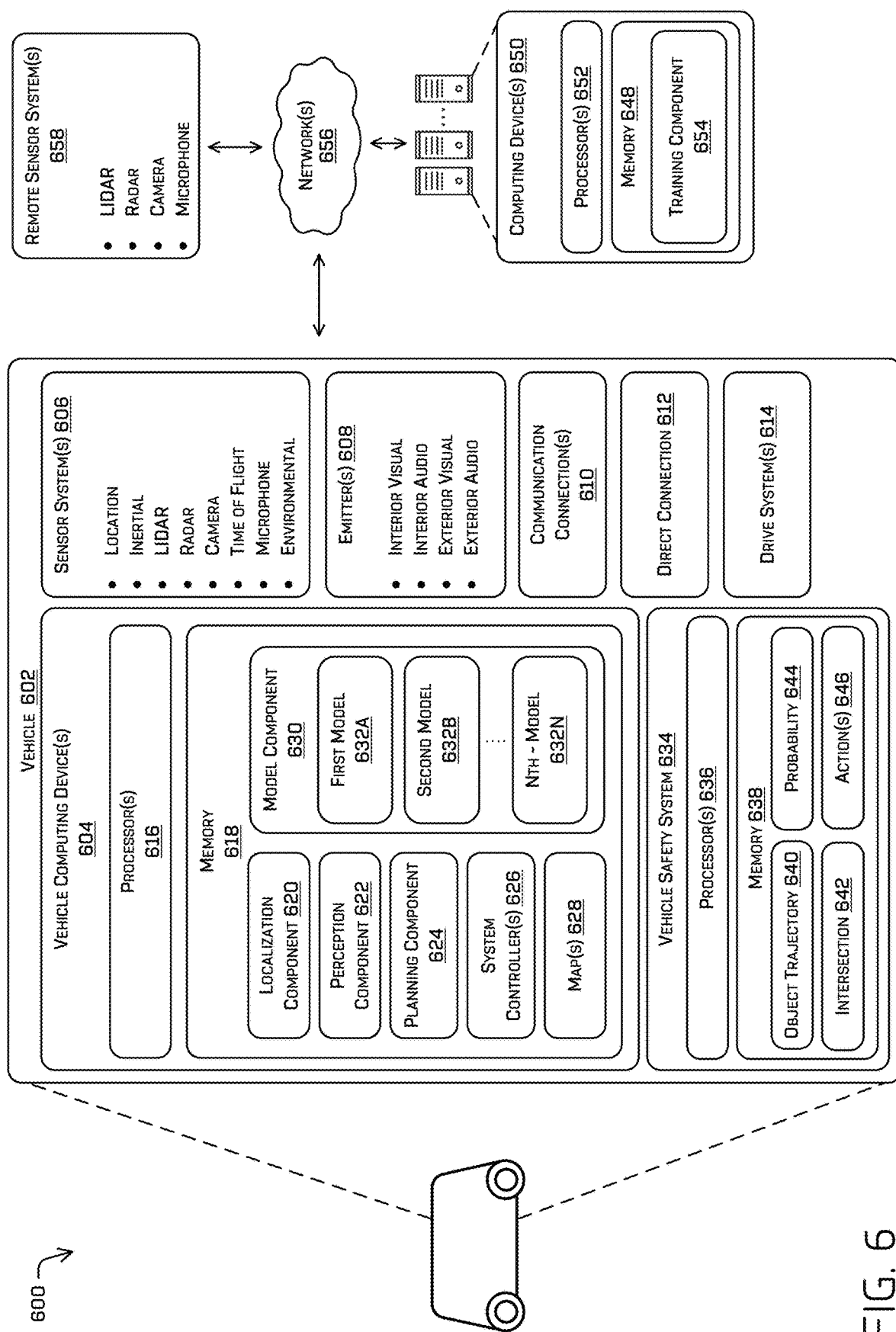
FIG. 6 is a block diagram of an example system for implementing the techniques described herein.

In some examples, the model component 110 can apply the first model 506A having a first set of time periods for one or more of the steps 510 and apply the second model 506B having a second set of time periods for different step(s) of the steps 510 associated with the tree search 508. In various examples, the first model 506A can be applied during the first step 510A and the second model 506B can be applied during the second step 510B such that more than one model can be applied during the tree search 508. An output of the tree search 508 can be generated by the model component 110 after completion of the last step which can represent, for example, the vehicle trajectory 210 to avoid the object 114 (showing the object representation 212 along the object trajectory 120). FIG. 6 is a block diagram of an example system 600 for implementing the techniques described herein. In at least one example, the system 600 may include a vehicle, such as vehicle 602.

The vehicle 602 may include a vehicle computing device 604 (also referred to as a vehicle computing device 604 or vehicle computing device(s) 604), one or more sensor systems 606, one or more emitters 608, one or more communication connections 610, at least one direct connection 612, and one or more drive systems 614.

The vehicle computing device(s) 604 may include one or more processors 616 and memory 618 communicatively coupled with the one or more processors 616. In the illustrated example, the vehicle 602 is an autonomous vehicle; however, the vehicle 602 could be any other type of vehicle, such as a semi-autonomous vehicle, or any other system having at least an image capture device (e.g., a camera enabled smartphone). In the illustrated example, the memory 618 of the vehicle computing device 604 stores a localization component 620, a perception component 622, a planning component 624, one or more system controllers 626, one or more maps 628, and a model component 630 including one or more models, such as a first model 632A, a second model 632B, up to an Nth model 632N (collectively "models 632"), where N can be any integer greater than 1. Though depicted in FIG. 6 as residing in the memory 618 for illustrative purposes, it is contemplated that the localization component 620, the perception component 622, the planning component 624, the one or more system controllers 626, the one or more maps 628, and/or the model component 630 including the models 632 may additionally, or alternatively, be accessible to the vehicle 602 (e.g., stored on, or otherwise accessible by, memory remote from the vehicle 602, such as, for example, on memory 648 of a remote computing device 650).

Additionally, vehicle 602 may include a vehicle safety system 634, including an object trajectory component 640, an intersection component 642, a probability component 644, and an action component 646. As shown in this example, the vehicle safety system 634 may be implemented separately from the vehicle computing device(s) 604, for example, for improved performance of the vehicle safety system, and/or to provide redundancy, error checking, and/or validation of determinations and/or commands determined by the vehicle computing device(s) 604. However, in other examples, the vehicle safety system 634 may be implemented as one or more components within the same vehicle computing device(s) 604.

By way of example, the vehicle computing device(s) 604 may be considered to be a primary system, while the vehicle safety system 634 may be considered to be a secondary system. The primary system may generally perform processing to control how the vehicle maneuvers within an environment. The primary system may implement various artificial intelligence (AI) techniques, such as machine learning, to understand an environment around the vehicle 602 and/or instruct the vehicle 602 to move within the environment. For example, the primary system may implement the AI techniques to localize the vehicle, detect objects around the vehicle, segment sensor data, determine classifications of the objects, predict object tracks, generate trajectories for the vehicle 602 and the objects around the vehicle, and so on. In some examples, the primary system may process data from multiple types of sensors on the vehicle, such as light detection and ranging (lidar) sensors, radar sensors, image sensors, depth sensors (time of flight, structured light, etc.), cameras, and the like, within the sensor systems 606.

In some examples, the vehicle safety system 634 may operate as separate system that receives state data (e.g., perception data) based on the sensor data and AI techniques implemented by the primary system (e.g., vehicle computing device(s) 604), and may perform various techniques described herein for improving collision prediction and avoidance by the vehicle 602. As described herein, the vehicle safety system 634 may implement techniques for predicting intersections/collisions based on sensor data, as well as probabilistic techniques that are based on positioning, velocity, acceleration, etc. of the vehicle and/or objects around the vehicle. In some examples, the vehicle safety system 634 may process data from sensors, such as a subset of sensor data that is processed by the primary system. To illustrate, the primary system may process lidar data, radar data, image data, depth data, etc., while the vehicle safety system 634 may process just lidar data and/or radar data (and/or time of flight data). In other examples, however, the vehicle safety system 634 may process sensor data from any number of sensors, such as data from each of the sensors, data from the same number of sensors as the primary system, etc.

Additional examples of a vehicle architecture comprising a primary computing system and a secondary computing system can be found, for example, in U.S. patent application Ser. No. 16/189,726 titled "Perception Collision Avoidance" and filed Nov. 13, 2018, the entirety of which is herein incorporated by reference in its entirety and for all purposes.

Although depicted in FIG. 6 as residing in the memory 618 for illustrative purposes, it is contemplated that the localization component 620, the perception component 622, the planning component 624, the model component 630, the system controllers 626, and the maps 628 may additionally, or alternatively, be accessible to the vehicle 602 (e.g., stored on, or otherwise accessible by, memory remote from the vehicle 602, such as, for example, on memory 648 of a remote computing device 650). Similarly, the object trajectory component 640, intersection component 642, probability component 644, and/or action component 646 are depicted as residing in the memory 638 of the vehicle safety system 634, one or more of these components may additionally, or alternatively, be implemented within vehicle computing device(s) 604 or may be accessible to the vehicle 602 (e.g., stored on, or otherwise accessible by, memory remote from the vehicle 602, such as, for example, on memory 648 of a remote computing device 650).

In at least one example, the localization component 620 may include functionality to receive data from the sensor system(s) 606 to determine a position and/or orientation of the vehicle 602 (e.g., one or more of an x-, y-, z-position, roll, pitch, or yaw). For example, the localization component 620 may include and/or request/receive a map of an environment, such as from map(s) 628 and/or map component 628, and may continuously determine a location and/or orientation of the autonomous vehicle within the map. In some instances, the localization component 620 may utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the autonomous vehicle. In some instances, the localization component 620 may provide data to various components of the vehicle 602 to determine an initial position of an autonomous vehicle for determining the relevance of an object to the vehicle 602, as discussed herein.

In some instances, the perception component 622 may include functionality to perform object detection, segmentation, and/or classification. In some examples, the perception component 622 may provide processed sensor data that indicates a presence of an object (e.g., entity) that is proximate to the vehicle 602 and/or a classification of the object as an object type (e.g., car, pedestrian, cyclist, animal, building, tree, road surface, curb, sidewalk, unknown, etc.). In some examples, the perception component 622 may provide processed sensor data that indicates a presence of a stationary entity that is proximate to the vehicle 602 and/or a classification of the stationary entity as a type (e.g., building, tree, road surface, curb, sidewalk, unknown, etc.). In additional or alternative examples, the perception component 622 may provide processed sensor data that indicates one or more features associated with a detected object (e.g., a tracked object) and/or the environment in which the object is positioned. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

In general, the planning component 624 may determine a path for the vehicle 602 to follow to traverse through an environment. For example, the planning component 624 may determine various routes and trajectories and various levels of detail. For example, the planning component 624 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 624 may generate an instruction for guiding the autonomous vehicle along at least a portion of the route from the first location to the second location. In at least one example, the planning component 624 may determine how to guide the autonomous vehicle from a first waypoint in the sequence of waypoints to a second waypoint in the sequence of waypoints. In some examples, the instruction may be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 602 to navigate.

In some examples, the planning component 624 can implement one or more tree search algorithms to determine the path for the vehicle 602. For instance, the planning component 624 can implement the model component 630 (having at least the functionality of the model component 110 of FIG. 1) to apply a tree search algorithm to a decision tree to determine a vehicle trajectory for the vehicle 602. In some examples, the vehicle computing device(s) 604 can exchange data with the computing device(s) 650 including sending log data associated with the tree search algorithm to the computing device(s) 650 and receiving updated or optimized algorithms from the computing device(s) 650.

In some examples, the planning component 624 may include a prediction component to generate predicted trajectories of objects (e.g., dynamic objects such as pedestrians, cars, trucks, bicyclists, animals, etc.) in an environment. For example, a prediction component may generate one or more predicted trajectories for objects within a threshold distance from the vehicle 602. In some examples, the planning component 624 can include or otherwise perform the functionality associated with the decision tree component 304 and/or the training component 104.

In at least one example, the vehicle computing device 604 may include one or more system controllers 626, which may be configured to control steering, propulsion, braking, safety, emitters, communication, and other systems of the vehicle 602. The system controller(s) 626 may communicate with and/or control corresponding systems of the drive system(s) 614 and/or other components of the vehicle 602.

The memory 618 may further include one or more maps 628 that may be used by the vehicle 602 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 602 may be controlled based at least in part on the map(s) 628. That is, the map(s) 628 may be used in connection with the localization component 620, the perception component 622, and/or the planning component 624 to determine a location of the vehicle 602, detect or determine gravity, detect objects in an environment, generate routes, determine actions and/or trajectories to navigate within an environment.

In some examples, the one or more maps 628 may be stored on a remote computing device(s) (such as the computing device(s) 650) accessible via network(s) 656. In some examples, multiple maps 628 may be stored based on, for example, a characteristic (e.g., type of entity, time of day, day of week, season of the year, etc.). Storing multiple maps 628 may have similar memory requirements, but increase the speed at which data in a map may be accessed.

As illustrated in FIG. 6, the vehicle computing device 604 may include a model component 630. The model component 630 may be configured to determine probabilities for an intersection between an object in an environment of the vehicle 602. For instance, the model component 630 can determine the output data 112 of FIG. 1. In various examples, the model component 630 may receive sensor data associated with an object from the localization component 620, the perception component 622, and/or from the sensor system(s) 606. In some examples, the model component 630 may receive map data from the localization component 620, the perception component 622, the maps 628, and/or the sensor system(s) 606. While shown separately in FIG. 6, the model component 630 could be part of the localization component 620, the perception component 622, the planning component 624, or other component(s) of the vehicle 602.

In various examples, the model component 630 may send output(s) from the first model 632A, the second model 632B, and/or the Nth model 632N may be used by the perception component 622 to alter or modify an amount of perception performed in an area of the object based on an associated intersection value. In some examples, the planning component 624 may determine one or more actions (e.g., reference actions and/or sub-actions) for the vehicle 602 based at least in part on output(s) from the model component 630. In some examples, the model component 630 may be configured to output information indicating a vehicle trajectory to avoid an object likely to cause a collision. In some examples, the model component 630 may include at least the functionality provided by the training component 104 and/or the model component 110 of FIG. 1.

In some examples, the model component 630 may communicate an output to the perception component 622 to cause an update to one or more parameters (e.g., bias values, drift values, and the like) associated with the sensor system(s) 606. In some examples, the model component 630 may communicate an output to the planning component 624 for consideration in planning operations (e.g., determining a final vehicle trajectory).

In various examples, the model component 630 may utilize machine learning techniques to determine an object intent, a node of a decision tree, a vehicle trajectory, an object position, an intersection probability, and so on, as described with respect to FIG. 1 and elsewhere. In such examples, machine learning algorithms may be trained to predict a vehicle trajectory with improved accuracy over time.

The vehicle safety system 634 may include an object trajectory component 640 configured to determine a trajectory for the vehicle 602 and/or trajectories for other objects identifying within an environment, using the various systems and techniques described herein. In some examples, the object trajectory component 640 may receive planning data, perception data, and/or map data from the components 620-626 to determine a planned trajectory for the vehicle 602 and trajectories for the other objects in the environment.

In some examples, the object trajectory component 640 determine a single planned trajectory for the vehicle 602 (e.g., based on planning data and map data received from the planning component 624 and maps 628, and may determine multiple trajectories for one or more other moving objects (e.g., vehicle 108) in the environment in which the vehicle 602 is operating. In some examples, the trajectories of another object may include any number of possible paths in which the object may travel from a current position (e.g., at the time of perception) and/or based on a direction of travel. Based on the determination that the agent is within the threshold distance or time to the vehicle 602, the object trajectory component 640 may determine the trajectories associated with the object. In some examples, the object trajectory component 640 may be configured to determine the possible trajectories of each detected moving object in the environment.

In various examples, the action component 646 may determine one or more actions for the vehicle 602 to take, based on predictions and/or probability determinations of an intersection between the vehicle 602 another object (e.g., vehicle 114), along with other factors. The action may include slowing the vehicle to yield to the object, stopping the vehicle to yield to the object, changing lanes or swerving left, or changing or swerving lanes right, etc. Based on the determined action, the vehicle computing device(s) 604, such as through the system controller(s) 626, may cause the vehicle 602 to perform the action. In at least some examples, such an action may be based on the probability of collision, determined by the probability component 644 based on multiple trajectories for the object, as described in detail. In various examples, responsive to determining to adjust a lateral position of the vehicle, such as in a lane change to the left or to the right, the vehicle safety system 634 may cause the components 640-646 to generate an updated vehicle trajectory, plot additional object trajectories with respect to the updated vehicle trajectory, determine updated potential collision zones, and perform time-space overlap analyses to determine whether an intersection risk may still exist after the determined action is performed by the vehicle 602.

The action component 646 may determine, in some examples, one or more actions for the vehicle 602 to take, based on receiving a signal form the model component 630. For instance, the model component 630 can determine an intersection probability between the vehicle 602 and one or more objects and generate a signal for sending to the action component 646.

As can be understood, the components discussed herein (e.g., the localization component 620, the perception component 622, the planning component 624, the one or more system controllers 626, the one or more maps 628, and the vehicle safety system 634 including the object trajectory component 640, the intersection component 642, the probability component 644, and the action component 646 are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 618 (and the memory 648, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 may include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 606 may include multiple instances of each of these or other types of sensors. For instance, the lidar sensors may include individual lidar sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the vehicle computing device 604. Additionally, or in the alternative, the sensor system(s) 606 may send sensor data, via the one or more networks 656, to the one or more computing device(s) 650 at a particular frequency, after a lapse of a predetermined period of time, in near real-time, etc. In some examples, the model component 630 may receive sensor data from one or more of the sensor system(s) 606.

The vehicle 602 may also include one or more emitters 608 for emitting light and/or sound. The emitters 608 may include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 608 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 may also include one or more communication connections 610 that enable communication between the vehicle 602 and one or more other local or remote computing device(s). For instance, the communication connection(s) 610 may facilitate communication with other local computing device(s) on the vehicle 602 and/or the drive system(s) 614. Also, the communication connection(s) 610 may allow the vehicle to communicate with other nearby computing device(s) (e.g., remote computing device 650, other nearby vehicles, etc.) and/or one or more remote sensor system(s) 658 for receiving sensor data. The communication connection(s) 610 also enable the vehicle 602 to communicate with a remote teleoperations computing device or other remote services.

The communication connection(s) 610 may include physical and/or logical interfaces for connecting the vehicle computing device 604 to another computing device or a network, such as network(s) 656. For example, the communication connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 may include one or more drive systems 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor systems to detect conditions of the drive system(s) 614 and/or the surroundings of the vehicle 602. By way of example and not limitation, the sensor system(s) may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 may include a drive system controller which may receive and preprocess data from the sensor system(s) and to control operation of the various vehicle systems. In some examples, the drive system controller may include one or more processors and memory communicatively coupled with the one or more processors. The memory may store one or more modules to perform various functionalities of the drive system(s) 614. Furthermore, the drive system(s) 614 may also include one or more communication connection(s) that enable communication by the respective drive system with one or more other local or remote computing device(s).

In at least one example, the direct connection 612 may provide a physical interface to couple the one or more drive system(s) 614 with the body of the vehicle 602. For example, the direct connection 612 may allow the transfer of energy, fluids, air, data, etc. between the drive system(s) 614 and the vehicle. In some instances, the direct connection 612 may further releasably secure the drive system(s) 614 to the body of the vehicle 602.

In at least one example, the localization component 620, the perception component 622, the planning component 624, the one or more system controllers 626, the one or more maps 628, and the model component 630, may process sensor data, as described above, and may send their respective outputs, over the one or more network(s) 656, to the computing device(s) 650. In at least one example, the localization component 620, the perception component 622, the planning component 624, the one or more system controllers 626, the one or more maps 628, and the model component 630 may send their respective outputs to the computing device(s) 650 at a particular frequency, after a lapse of a predetermined period of time, in near real-time, etc.

In some examples, the vehicle 602 may send sensor data to the computing device(s) 650 via the network(s) 656. In some examples, the vehicle 602 may receive sensor data from the computing device(s) 650 and/or remote sensor system(s) 658 via the network(s) 656. The sensor data may include raw sensor data and/or processed sensor data and/or representations of sensor data. In some examples, the sensor data (raw or processed) may be sent and/or received as one or more log files.

The computing device(s) 650 may include processor(s) 652 and a memory 648 storing a training component 654.

In some instances, the training component 654 can include functionality to train a machine learning model to output values, parameters, and the like associated with one or more algorithms. For example, the training component 654 can receive data that represents log data (e.g., publicly available data, sensor data, and/or a combination thereof) associated with a real-world environment. At least a portion of the log data can be used as an input to train the machine learning model. As a non-limiting example, sensor data, audio data, image data, map data, inertia data, vehicle state data, historical data (log data), or a combination thereof may be input into the machine learned model. Thus, by providing data where the vehicle traverses an environment, the training component 654 can be trained to output a vehicle trajectory that avoids objects in the real-world environment, as discussed herein.

In some examples, the training component 654 may be implemented to train the model component 630. Training data may include a wide variety of data, such as image data, video data, lidar data, radar data, audio data, other sensor data, observed trajectories of objects, labelled data (e.g., labelled collision data, labelled object intent data), etc., that is associated with a value (e.g., a desired classification, inference, prediction, etc.). Such data and associated values may generally be referred to as a "ground truth." In such examples, the training component 654 may determine a difference between the ground truth (e.g., training data) and output(s) by the model component 630. Based at least in part on the difference(s), training by the training component 654 may include altering a parameter of the machine-learned model to minimize the difference(s) to obtain a trained machine-learned model that is configured to determine potential intersection(s) between object(s) in the environment and the vehicle 602.

In various examples, during training, the model component 630 may adjust weights, filters, connections between layers, and/or parameters for training the individual untrained neural networks to predict potential intersection(s) (or other tasks), as discussed herein. In some instances, the model component 630 may use supervised or unsupervised training.

In some examples, the training component 654 can include training data that has been generated by a simulator. For example, simulated training data can represent examples where a vehicle collides with an object in an environment or nearly collides with an object in an environment, to provide additional training examples.

In some examples, functionality provided by the training component 654 may be included and/or performed by the vehicle computing device 604.

The processor(s) 616 of the vehicle 602, processor(s) 636 of the vehicle safety system 634, and/or the processor(s) 652 of the computing device(s) 650 may be any suitable processor capable of executing instructions to process data and perform operations as described herein. By way of example and not limitation, the processor(s) 616, 636, and 652 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 618, memory 638, and memory 648 are examples of non-transitory computer-readable media. The memory 618, the memory 638, and/or memory 648 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 618, the memory 638, and memory 648 may include at least a working memory and a storage memory. For example, the working memory may be a high-speed memory of limited capacity (e.g., cache memory) that is used for storing data to be operated on by the processor(s) 616, 636, and/or 652. In some instances, the memory 618, the memory 638, and memory 648 may include a storage memory that may be a lower-speed memory of relatively large capacity that is used for long-term storage of data. In some cases, the processor(s) 616, 636, and/or 652 cannot operate directly on data that is stored in the storage memory, and data may need to be loaded into a working memory for performing operations based on the data, as discussed herein.

It should be noted that while FIG. 6 is illustrated as a distributed system, in alternative examples, components of the vehicle 602 may be associated with the computing device(s) 650 and/or components of the computing device(s) 650 may be associated with the vehicle 602. That is, the vehicle 602 may perform one or more of the functions associated with the computing device(s) 650, and vice versa. For instance, either the vehicle 602 and/or the computing device(s) 650 may perform training operations relating to one or more of the models described herein.

Figure 7:
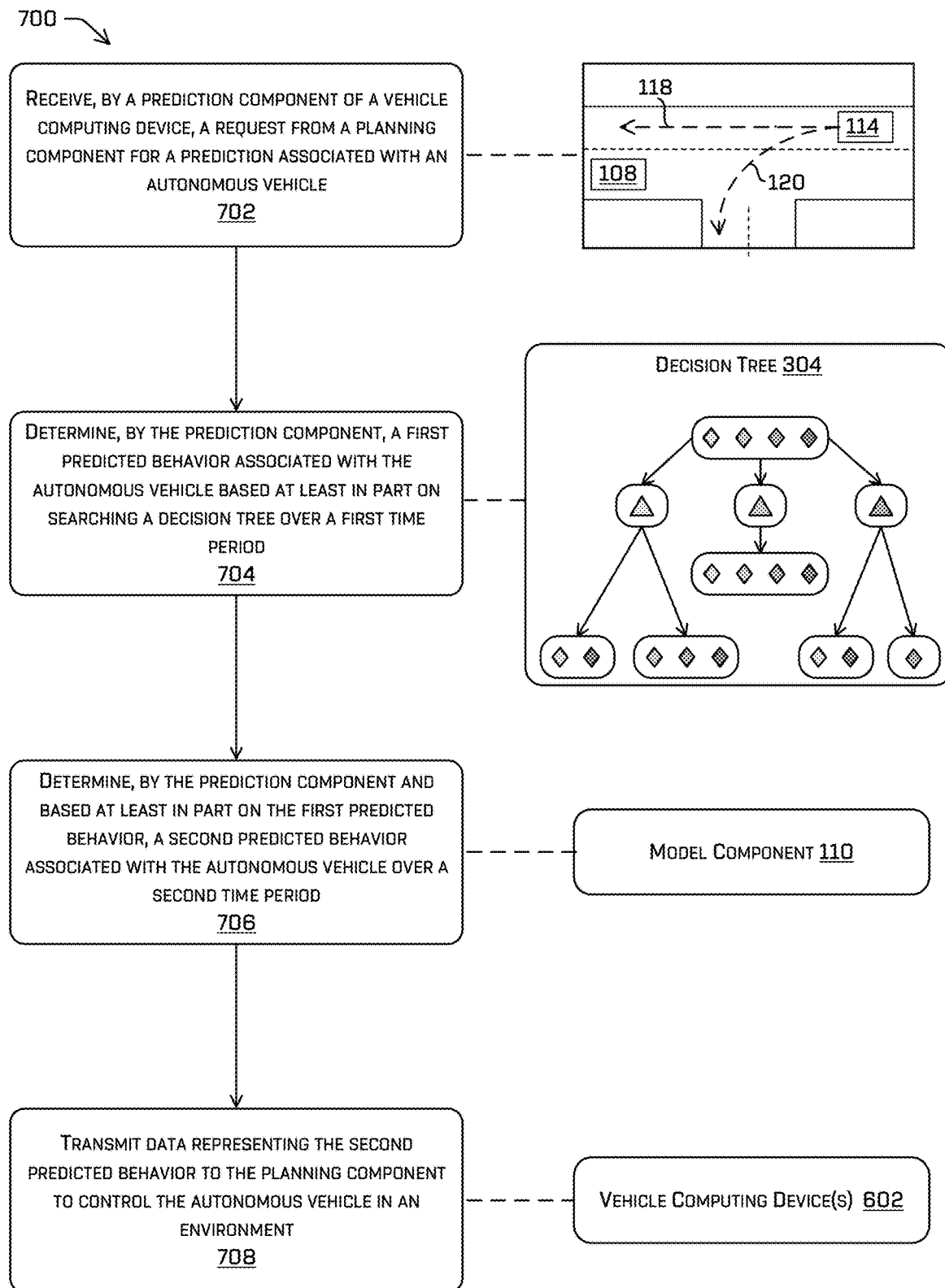
FIG. 7 is a flowchart depicting an example process for controlling a vehicle based on an output by an example model trained with variable step sizes.

FIG. 7 is a flowchart depicting an example process 700 for controlling a vehicle based on an output by an example model trained with variable step sizes. Some or all of the process 700 may be performed by one or more components in FIGS. 1-6, as described herein. For example, some or all of process 700 may be performed by the vehicle computing device(s) 604, the vehicle safety system 634, and/or the computing device(s) 650 of FIG. 6.

At operation 702, the process may include receiving, by a prediction component of a vehicle computing device, a request from a planning component for a prediction associated with an autonomous vehicle. For example, the vehicle computing device(s) 604 can implement the planning component 624 to send a request for a prediction associated with the vehicle 602 including one or more of: a pose, a position, an orientation, a velocity, a yaw; or an acceleration. In some examples, the prediction component can include a model, such as machine learned model, that is configured to determine motion, a position, or other characteristic of the vehicle 602 in the future. In some examples, the prediction component can represent the model component 110 of FIG. 1. The prediction associated with the autonomous vehicle can represent a period of time in the future, such as 4 seconds, 8 seconds, or some other set time. For example, the planning component 624 can request that the prediction component provide one or more predictions (a future position, acceleration, etc.) of the vehicle 602 and/or of object(s) proximate the vehicle. This predictions may be represented as discrete representations in time, as a representation with corresponding track(s) for object(s), etc.

At operation 704, the process may include determining, by the prediction component, a first predicted behavior associated with the autonomous vehicle based at least in part on applying an algorithm to search a decision tree over the first time period. In examples, a prediction component may receive one or more planned behaviors for the autonomous vehicle for a planner component, for example, and may make prediction(s) using this information (e.g., how other objects may react in response to planned autonomous vehicle actions). The prediction component can be configured to search a decision tree over the first time period to determine such predictions. The first time period can represent a portion of the period of time for the prediction such as one second of an eight second prediction. The decision tree (e.g., the decision tree 304) can be encoded with nodes to represent the state data associated with the autonomous vehicle, the object, map data representing the environment, and the like. The output from the prediction component can represent a pose (or other state) of the autonomous vehicle and/or object(s) at a future time (e.g., after the search over the first time period).

At operation 706, the process may include determining, by the prediction component and based at least in part on the first predicted behavior, a second predicted behavior associated with the autonomous vehicle over a second time period. The first time period can, for instance, be different (e.g., shorter or longer) from the second time period. In some examples, the operation 706 can include the prediction component determining a second predicted position, motion, or other state of the autonomous vehicle over the second time period. In various examples, the second time period can be associated with a different step of a tree search than the first time period. For example, different steps of the tree search can use different time periods and may be referred to herein as variable time steps. For example, the prediction component can use variable time periods for at least some of the steps of the search based at least in part on the first predicted behavior (e.g., the first predicted behavior can be used as an input at the start of the second time period). In various examples, the first predicted behavior and/or the second predicted behavior can represent an action, an intent, an attribute, a type, or other characteristic of the vehicle 602.

At operation 708, the process may include transmitting data representing the second predicted behavior to the planning component to control the autonomous vehicle in an environment. For instance, the operation 710 can include the prediction component sending second predicted behavior representing a future position, orientation, velocity, trajectory, etc. of the autonomous vehicle. The planning component can, for example, apply a tree search algorithm to a decision tree (e.g., the decision tree 304) to identify different paths through different nodes to simulate potential interactions between the autonomous vehicle and one or more objects in an environment. In some examples, controlling the autonomous vehicle can include outputting a trained model to the vehicle computing device(s) 604 usable to determine a vehicle trajectory for controlling the autonomous vehicle in the environment. For example, the operation 710 may include determining the vehicle trajectory based at least in part on a lowest cost to traverse the decision tree (e.g., selecting a trajectory by a combination of nodes that result in a lowest combined cost). In various examples, the vehicle computing device(s) 604 is configured to determine a trajectory for the vehicle (e.g., the vehicle trajectory 210) based at least in part on the output. The vehicle computing device may determine a final vehicle trajectory based at least in part on the vehicle trajectory thereby improving vehicle safety by planning for the possibility that the object may intersect with the vehicle in the future. Additional details of controlling a vehicle using one or more outputs are discussed throughout the disclosure.

Figure 8:
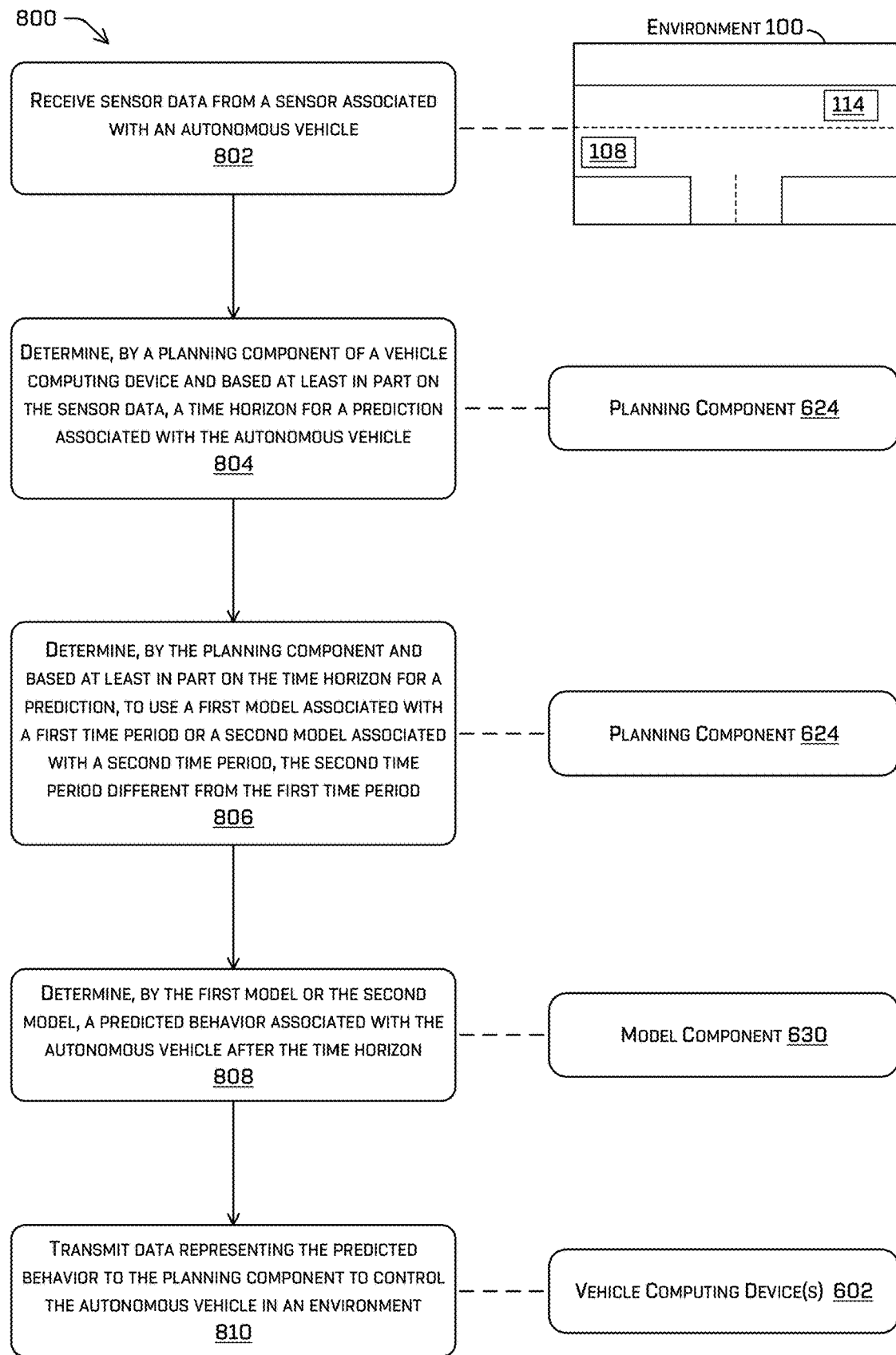
FIG. 8 is a flowchart depicting an example process for determining a time horizon for a prediction associated with an autonomous vehicle.

FIG. 8 is a flowchart depicting an example process 800 for determining a time horizon for a prediction associated with an autonomous vehicle. Some or all of the process 800 may be performed by one or more components in FIGS. 1-6, as described herein. For example, some or all of process 800 may be performed by the vehicle computing device(s) 604, the vehicle safety system 634, and/or the computing device(s) 650 of FIG. 6.

At operation 802, the process may include receiving sensor data from a sensor associated with an autonomous vehicle. For example, a planning component 624 of the vehicle computing device(s) 604 can receive sensor data representing an environment, a vehicle, and one or more objects from one or more sensors coupled to and/or remote from the vehicle. In some examples, the two or more sensors can be associated with different modalities. The sensor data can represent processed sensor data that includes bounding box information for the vehicle (e.g., the vehicle 108) and an object (e.g., the object 114).

At operation 804, the process may include determining, by a planning component of a vehicle computing device and based at least in part on the sensor data, a time horizon for a prediction associated with the autonomous vehicle. For example, the planning component 624 can determine attributes of the environment within a threshold distance of the vehicle and output an indication of whether the environment includes a number of objects above a threshold number (e.g., a number of pedestrians or vehicles is above a value to be considered a dense environment). The time horizon can be determined with consideration to how many objects are in the environment to save computational resources (e.g., use a shorter time horizon in environment when fewer resources are sufficient to safely control the vehicle in the environment relative to the objects, and to dedicate more computational resources (e.g., a longer time horizon) in an environment in which there are more objects to consider during the prediction. As disclosed herein, attributes for determining a variable horizon or a variable step size within a time horizon can be interchangeable and both a horizon and step size may be varied concurrently.

In some examples, the planning component 624 can receive vehicle state data and/or object state data indicating a current or previous state of the vehicle and/or the one or more objects in the environment, and determine the time horizon based at least in part on the vehicle state data and/or object state data. The planning component 624 can also use a planned future action of the autonomous vehicle for determining a corresponding appropriate time horizon. For example, the time horizon can be determined based at least in part on a velocity, acceleration, steering angle, braking rate, or other state of the vehicle and/or the object. By way of example and not limitation, the vehicle can be preparing to merge onto a highway from a merge lane, and the planning component 624 can determine a time horizon suitable for accelerating and smoothly merging into traffic.

In some examples, the planning component 624 can process the sensor data to determine an object type associated with the one or more objects proximate the vehicle, and determine a time horizon based at least in part on the object type(s). For instance, the time horizon for the prediction can be based on whether the detected objects are pedestrians, another vehicle, a bicyclist, etc. Thus, the planning component 624 can determine the time horizon with consideration to an objects(s) ability to accelerate, change direction (e.g., enter a path of the vehicle), etc. The planning component 624 can also or instead determine the time horizon on a predicted number of objects having aberrant or unexpected behavior. For instance, an object can be associated with different levels of reaction to the vehicle, such as during a simulation (e.g., ranging from no reaction to reacting to an action by the vehicle to avoid the vehicle). In other words, the planning component 624 can determine a time horizon for a prediction that accounts for a likelihood that a pedestrian can jump in front of the vehicle, a vehicle can turn in front of the vehicle without a signal, and the like. Additional examples of planning for different possible object behaviors can be found, for example, in U.S. patent application Ser. No. 17/900,658 titled "Adverse Prediction Planning" and filed Aug. 31, 2022, the entirety of which is herein incorporated by reference in its entirety and for all purposes.

At operation 806, the process may include determining (or otherwise selecting to use), by the planning component and based at least in part on the time horizon for a prediction, to use a first model associated with a first time period or a second model associated with a second time period, the second time period different from the first time period. For instance, the planning component 624 can select a model from a catalog or other data source based on comparing respective time periods for each available model, and selecting the model having a time period that matches the time horizon.

At operation 808, the process may include determining, by the first model or the second model, a predicted behavior associated with the autonomous vehicle after the time horizon. For instance, the selected model (e.g., the model component 630) can receive the sensor data, map data, and/or other input data and determine an output that represents a vehicle action or a vehicle position 4 seconds into the future (or some other time corresponding to the determined time horizon). In some examples, models associated with different time horizons can be stored in memory and accessed by the planning component 624 responsive to determining a current time horizon for a prediction.

The operation 808 can include, in some examples, the planning component 624 applying a tree search algorithm to a decision tree (e.g., the decision tree 304) to identify different paths through different nodes to simulate potential interactions between the vehicle and one or more objects in an environment.

At operation 810, the process may include transmitting data representing the predicted behavior to the planning component to control the autonomous vehicle in an environment. For instance, the operation 810 can include the model component 630 sending predicted behavior representing a future position, orientation, velocity, trajectory, etc. of the autonomous vehicle to the planning component 624. In some examples, the planning component 624 can determining a vehicle trajectory for controlling the autonomous vehicle in the environment. For example, the operation 810 may include determining the vehicle trajectory based at least in part on a lowest cost to traverse the decision tree (e.g., selecting a trajectory by a combination of nodes that result in a lowest combined cost).

FIGS. 2, 7, and 8 illustrate example processes in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes. In some embodiments, one or more operations of the method may be omitted entirely. Moreover, the methods described herein can be combined in whole or in part with each other or with other methods.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the processes.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Example Clauses

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the one or more processors to perform operations comprising: receiving, by a prediction component of an autonomous vehicle in an environment, from a planning component of the autonomous vehicle, a request for discrete predictions associated with the autonomous vehicle within a future time horizon; determining, by the prediction component, a first discrete prediction associated with the autonomous vehicle based at least in part on searching a decision tree wherein the first discrete prediction corresponds to a first time step change of the environment within the future time horizon; determining, by the prediction component and based at least in part on the first discrete prediction, a second discrete prediction associated with the autonomous vehicle wherein the second discrete prediction corresponds to a second time step change of the environment within the future time horizon, the second time step different form the first time step; and transmitting data representing the first discrete prediction and the second discrete prediction to the planning component to control the autonomous vehicle in the environment.

B: The system of paragraph A, the operations further comprising: assigning a first weight to the first time step and a second weight to the second time step; and determining the second discrete prediction is further based at least in part on applying an algorithm to search the decision tree using the first weight and the second weight.

C: The system of paragraph A, the operations further comprising: determining, based at least in part on the data and by the planning component, an interaction between the autonomous vehicle and an object in the environment at a future time; and determining, based at least in part on the interaction, a trajectory for the autonomous vehicle to navigate in the environment relative to the object.

D: The system of paragraph A, wherein the second time step extends from a time corresponding to the first discrete prediction.

E: The system of paragraph A, wherein the decision tree is encoded with nodes to represent the autonomous vehicle and one or more objects in the environment, wherein edges of the nodes correspond to interaction between the nodes.

F: One or more non-transitory computer-readable media storing instructions that, when executed, cause one or more processors to perform operations comprising: receiving, by a model, a request for a prediction associated with a vehicle and an object in an environment: determining, by the model, first state data associated with the vehicle or the object based at least in part on searching a decision tree, wherein the first state data corresponding to a first time period: determining, by the model and based at least in part on the first state data, second state data associated with the vehicle or the object over a second time period, wherein the first time period is different from the second time period; and transmitting data representing the second state data to a component of a vehicle computing device to control the vehicle in the environment.

G: The one or more non-transitory computer-readable media of paragraph F, the operations further comprising: assigning a first weight to the first time period and a second weight to the second time period; and determining the second state data is further based at least in part on applying an algorithm to search the decision tree using the first weight and the second weight.

H: The one or more non-transitory computer-readable media of paragraph F, the operations further comprising: determining, based at least in part on the data, an interaction between the vehicle and the object in the environment at a future time; and determining, based at least in part on the interaction, a trajectory for the vehicle to navigate in the environment relative to the object.

I: The one or more non-transitory computer-readable media of paragraph F, wherein the model is a Recurrent Neural Network.

J: The one or more non-transitory computer-readable media of paragraph F, wherein: the decision tree is encoded with nodes to represent the vehicle, the object, and the environment, and the first state data or the second state data indicates an action or an intent by the vehicle relative to the object.

K: The one or more non-transitory computer-readable media of paragraph F, the operations further comprising: determining a vehicle trajectory for the vehicle based at least in part on applying a tree search algorithm to the decision tree, and controlling the vehicle using the vehicle trajectory to navigate in the environment.

L: The one or more non-transitory computer-readable media of paragraph F, the operations further comprising: determining, based at least in part on sensor data from one or more sensors, a predicted action of the object; and determining to apply the model based at least in part on the predicted action of the object meeting or exceeding a threshold.

M: The one or more non-transitory computer-readable media of paragraph F, the operations further comprising: determining, based at least in part on sensor data from one or more sensors, a number of objects within a distance of the vehicle; and determining the first time period or the second time period based at least in part on the number of objects.

N: The one or more non-transitory computer-readable media of paragraph F, wherein the second time period is longer than the first time period.

O: The one or more non-transitory computer-readable media of paragraph F, the operations further comprising: accessing the model from a catalog wherein the catalog includes a first model corresponding to the first time period and a second model corresponding to the second time period.

P: The one or more non-transitory computer-readable media of paragraph F, wherein: the model is a machine learned model, the first state data or the second state data comprises at least one of: a pose, a position, an orientation, a heading, a velocity, a speed, an acceleration, a yaw, or turning rate associated with the vehicle or the object.

Q: A method comprising: receiving, by a model, a request for a prediction associated with a vehicle and an object in an environment: determining, by the model, first state data associated with the vehicle or the object based at least in part on searching a decision tree wherein the first state data corresponds to a first time period: determining, by the model and based at least in part on the first state data, second state data associated with the vehicle or the object over a second time period, wherein the first time period is different from the second time period; and transmitting data representing the second state data to a component of a vehicle computing device to control the vehicle in the environment.

R: The method of paragraph Q, further comprising: assigning a first weight to the first time period and a second weight to the second time period; and determining the second state data is further based at least in part on applying an algorithm to search the decision tree using the first weight and the second weight.

S: The method of paragraph Q, further comprising: determining, based at least in part on the data, an interaction between the vehicle and the object in the environment at a future time; and determining, based at least in part on the interaction, a trajectory for the vehicle to navigate in the environment relative to the object.

T: The method of paragraph Q, wherein: the decision tree is encoded with nodes to represent the vehicle, the object, and the environment, and the first state data or the second state data indicates an action or an intent by the vehicle relative to the object.

U: A method comprising: receiving, by a model, input data including vehicle state data associated with a vehicle in an environment, object state data associated with an object in the environment, and map data representing the environment at a first time; determining, by the model and based at least in part on the input data, a first time period to search a decision tree and a second time period to search the decision tree, the second time period longer than the first time period: determining, by the model, a first output after the first time period and a second output after the second time period; and controlling the vehicle in the environment based at least in part on the first output and the second output.

V: The method of paragraph U, further comprising: selecting the model from a set of models based at least in part on a velocity of the vehicle or a velocity of the object being above a velocity threshold.

W: The method of paragraph U, wherein the model is a first machine learned model, and further comprising: training the first machine learned model to output the first time period and the second time period based at least in part on an output from a second machine learned model representing first vehicle data and hidden state data associated with the vehicle.

X: The method of paragraph W, wherein the model is a Recurrent Neural Network.

Y: A system comprising: one or more processors; and one or more non-transitory computer-readable media storing instructions executable by the one or more processors, wherein the instructions, when executed, cause the one or more processors to perform operations comprising: receiving, from a sensor associated with an autonomous vehicle, sensor data associated with an environment: determining, by a planning component of the autonomous vehicle and based at least in part on the sensor data, a temporal length of a time horizon for prediction associated with the autonomous vehicle and the environment wherein the temporal length is variable: determining, by the planning component, within the time horizon, multiple discrete predictions associated with the autonomous vehicle and the environment: determining, by the planning component and based at least in part on the multiple discrete predictions, an action for the autonomous vehicle; and controlling the autonomous vehicle based at least in part on the action.

Z: The system of paragraph Y, wherein determining the temporal length comprises: determining, based at least in part on the sensor data, a number of objects in the environment within a threshold distance of the autonomous vehicle; and determining the temporal length based at least in part on the number of objects in the environment.

AA: The system of paragraph Y, wherein determining the temporal length comprises: determining, based at least in part on the sensor data, a velocity of an object proximate the autonomous vehicle; and determining the temporal length based at least in part on the velocity of the object.

AB: The system of paragraph Y, wherein: a first one of the multiple discrete predictions is determined by a first model and corresponds to a first time step within the time horizon; and a second one of the multiple discrete predictions is determined by a second model and corresponds to a second time step within the time horizon wherein the second time step differs in length from the first time step.

AC: The system of paragraph Y, wherein the multiple discrete predictions are based at least in part on a potential action of the autonomous vehicle; and the action corresponds to a trajectory for the autonomous vehicle to navigate in the environment relative to one or more objects in the environment.

AD: One or more non-transitory computer-readable media storing instructions that, when executed, cause one or more processors to perform operations comprising: receiving sensor data from a sensor associated with a vehicle, the sensor data associated with one or more object in an environment: determining, by the vehicle, a temporal length of a time horizon for a prediction associated with the vehicle and the one or more objects, wherein the temporal length is variable: determining a predicted state associated with the vehicle in the environment within the time horizon; and controlling the vehicle based at least in part on the predicated state.

AE: The one or more non-transitory computer-readable media of paragraph AD, wherein determining the temporal length comprises: determining, based at least in part on the sensor data, a velocity of an object proximate the vehicle; and determining the temporal length based at least in part on the velocity of the object.

AF: The one or more non-transitory computer-readable media of paragraph AD, wherein the operations further comprise: determining, by the vehicle and based at least in part on the temporal length, to use a model from a database of models associated with different time periods: determining, by the model, the predicted state; and transmitting data representing the predicted state to a planning component to control the vehicle in the environment.

AG: The one or more non-transitory computer-readable media of paragraph H, wherein the operations further comprise selecting multiple models from a catalog wherein each model corresponds to a respective time period, and wherein the respective time periods collectively match the temporal length of the time horizon.

AH: The one or more non-transitory computer-readable media of paragraph AD, wherein the predicted state is determined based on an expected action by the vehicle relative to the one or more objects in the environment, and the operations further comprising: determining, based at least in part on the predicted state, a trajectory for the vehicle to navigate in the environment relative to the one or more objects.

AI: The one or more non-transitory computer-readable media of paragraph AD, wherein determining the time horizon comprises: determining, based at least in part on the sensor data, an object type of an object proximate the vehicle; and determining the time horizon based at least in part on the object type of the object.

AJ: The one or more non-transitory computer-readable media of paragraph AD, wherein the temporal length is determined based at least in part on available resources of the vehicle.

AK: The one or more non-transitory computer-readable media of paragraph AD, wherein the predication associated with the vehicle associated with the time horizon is a first prediction and, within the time horizon a second prediction is determined for the vehicle with a corresponding time horizon.

AL: The one or more non-transitory computer-readable media of paragraph AD, wherein a database of models associated with different time horizons comprise a first model associated with a first time period and a second model associated with a second time period, the second time period different from the first time period.

AM: The one or more non-transitory computer-readable media of paragraph AD, the operations further comprising: storing a model associated with the temporal length of the time horizon in a catalog.

AN: The one or more non-transitory computer-readable media of paragraph AD, wherein: the prediction associated with the vehicle comprises at least one of: a pose, a position, an orientation, a heading, a velocity, a speed, an acceleration, a yaw, or turning rate associated with the vehicle.

AO: A method comprising: receiving sensor data from a sensor associated with a vehicle, the sensor data associated with one or more object in an environment; determining, by the vehicle, a temporal length of a time horizon for prediction associated with the vehicle and the one or more objects, wherein the temporal length is variable; determining a predicted state associated with the vehicle in the environment within the time horizon; and controlling the vehicle based at least in part on the predicated state.

AP: The method of paragraph AO, wherein determining the temporal length comprises: determining, based at least in part on the sensor data, a velocity of an object proximate the vehicle; and determining the temporal length based at least in part on the velocity of the object.

AQ: The method of paragraph AO, further comprising: determining, by the vehicle and based at least in part on the temporal length, to use a model from a database of models associated with different time periods: determining, by the model, the predicted state; and transmitting data representing the predicted state to a planning component to control the vehicle in the environment.

AR: The method of paragraph AO, wherein the predicted state is determined based on an expected action by the vehicle relative to the one or more objects in the environment, and further comprising: determining, based at least in part on the predicted state, a trajectory for the vehicle to navigate in the environment relative to the one or more objects.

While the example clauses described below are described with respect to one particular implementation, it should be understood that, in the context of this document, the content of the example clauses can also be implemented via a method, device, system, computer-readable medium, and/or another implementation. Additionally, any of examples A-AR may be implemented alone or in combination with any other one or more of the examples A-AR.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the one or more processors to perform operations comprising:
receiving, by a prediction component of an autonomous vehicle in an environment, from a planning component of the autonomous vehicle, a request for discrete predictions associated with the autonomous vehicle within a future time horizon;
determining, by the prediction component, a first discrete prediction associated with the autonomous vehicle based at least in part on searching a decision tree wherein the first discrete prediction corresponds to a first time step within the future time horizon;
determining, by the prediction component and based at least in part on the first discrete prediction, a second discrete prediction associated with the autonomous vehicle, wherein the second discrete prediction corresponds to a second time step within the future time horizon, the second time step different from the first time step;
transmitting data representing the first discrete prediction and the second discrete prediction to the planning component; and
controlling, by the planning component, the autonomous vehicle in the environment.

2. The system of claim 1, the operations further comprising:
assigning a first weight to the first time step and a second weight to the second time step; and
determining the second discrete prediction is further based at least in part on applying an algorithm to search the decision tree using the first weight and the second weight.

3. The system of claim 1, the operations further comprising:
determining, based at least in part on the data and by the planning component, an interaction between the autonomous vehicle and an object in the environment at a future time; and
determining, based at least in part on the interaction, a trajectory for the autonomous vehicle to navigate in the environment relative to the object.

4. The system of claim 1, wherein the second time step extends from a time corresponding to the first discrete prediction.

5. The system of claim 1, wherein the decision tree is encoded with nodes to represent the autonomous vehicle and one or more objects in the environment, wherein edges of the nodes correspond to interaction between the nodes.

6. One or more non-transitory computer-readable media storing instructions that, when executed, cause one or more processors to perform operations comprising:
receiving, by a model, a request for a prediction associated with a vehicle and an object in an environment, the prediction associated with a time horizon;
determining, by the model, first state data associated with the vehicle or the object based at least in part on searching a decision tree, the first state data corresponding to a first time period of the time horizon;
determining, by the model and based at least in part on the first state data, second state data associated with the vehicle or the object over a second time period of the time horizon, wherein the first time period of the time horizon is different from the second time period of the time horizon;
transmitting data representing the second state data to a component of a vehicle computing device; and
controlling, by the component, the vehicle in the environment.

7. The one or more non-transitory computer-readable media of claim 6, the operations further comprising:
assigning a first weight to the first time period of the time horizon and a second weight to the second time period of the time horizon; and
determining the second state data is further based at least in part on applying an algorithm to search the decision tree using the first weight and the second weight.

8. The one or more non-transitory computer-readable media of claim 6, the operations further comprising:
determining, based at least in part on the data, an interaction between the vehicle and the object in the environment at a future time; and
determining, based at least in part on the interaction, a trajectory for the vehicle to navigate in the environment relative to the object.

9. The one or more non-transitory computer-readable media of claim 6, wherein the model is a Recurrent Neural Network.

10. The one or more non-transitory computer-readable media of claim 6, wherein:
the decision tree is encoded with nodes to represent the vehicle, the object, and the environment, and
the first state data or the second state data indicates an action or an intent by the vehicle relative to the object.

11. The one or more non-transitory computer-readable media of claim 6, the operations further comprising:
determining a vehicle trajectory for the vehicle based at least in part on applying a tree search algorithm to the decision tree, and
controlling the vehicle comprises controlling the vehicle using the vehicle trajectory to navigate in the environment.

12. The one or more non-transitory computer-readable media of claim 6, the operations further comprising:
determining, based at least in part on sensor data from one or more sensors, a predicted action of the object; and determining to apply the model based at least in part on the predicted action of the object meeting or exceeding a threshold.

13. The one or more non-transitory computer-readable media of claim 6, the operations further comprising:
determining, based at least in part on sensor data from one or more sensors, a number of objects within a distance of the vehicle; and
determining the first time period or the second time period based at least in part on the number of objects.

14. The one or more non-transitory computer-readable media of claim 6, wherein the second time period is longer than the first time period.

15. The one or more non-transitory computer-readable media of claim 6, the operations further comprising:
accessing the model from a catalog wherein the catalog includes a first model corresponding to the first time period and a second model corresponding to the second time period.

16. The one or more non-transitory computer-readable media of claim 6, wherein:
the model is a machine learned model, and
the first state data or the second state data comprises at least one of: a pose, a position, an orientation, a heading, a velocity, a speed, an acceleration, a yaw, or turning rate associated with the vehicle or the object.

17. A method comprising:
receiving, by a model, a request for a prediction associated with a vehicle and an object in an environment, the prediction associated with a time horizon;
determining, by the model, first state data associated with the vehicle or the object based at least in part on searching a decision tree, wherein the first state data corresponds to a first time period of the time horizon;
determining, by the model and based at least in part on the first state data, second state data associated with the vehicle or the object over a second time period of the time horizon, wherein the first time period of the time horizon is different from the second time period of the time horizon;
transmitting data representing the second state data to a component of a vehicle computing device; and
controlling, by the component, the vehicle in the environment.

18. The method of claim 17, further comprising:
assigning a first weight to the first time period and a second weight to the second time period; and
determining the second state data is further based at least in part on applying an algorithm to search the decision tree using the first weight and the second weight.

19. The method of claim 17, further comprising:
determining, based at least in part on the data, an interaction between the vehicle and the object in the environment at a future time; and
determining, based at least in part on the interaction, a trajectory for the vehicle to navigate in the environment relative to the object.

20. The method of claim 17, wherein:
the decision tree is encoded with nodes to represent the vehicle, the object, and the environment, and
the first state data or the second state data indicates an action or an intent by the vehicle relative to the object.

* * * * *